US012655807B2

(12) United States Patent
Tada et al.

(10) Patent No.: US 12,655,807 B2
(45) Date of Patent: Jun. 16, 2026

(54) CONTROL CIRCUITRY FOR A VEHICLE WITH STOP CONTROL OF AN INTERNAL COMBUSTION ENGINE

(71) Applicant: KAWASAKI MOTORS, LTD., Akashi (JP)

(72) Inventors: Tomoki Tada, Akashi (JP); Kosuke Obayashi, Kobe (JP); Takuya Mizoguchi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 37 days.

(21) Appl. No.: 18/951,161

(22) Filed: Nov. 18, 2024

(65) Prior Publication Data

US 2025/0188884 A1 Jun. 12, 2025

(30) Foreign Application Priority Data

Dec. 11, 2023 (JP) ................................. 2023-208831

(51) Int. Cl.
*B62J 45/20* (2020.01)
*F02D 41/04* (2006.01)
(Continued)

(52) U.S. Cl.
CPC ............ *F02D 41/042* (2013.01); *B62J 45/20* (2020.02); *F02N 11/08* (2013.01); *G07C 5/10* (2013.01);
(Continued)

(58) Field of Classification Search
CPC ............... B60K 11/06; B60K 2006/20; B60K 2006/22; B60K 2006/26; B60K 2006/268;
(Continued)

(56) References Cited

U.S. PATENT DOCUMENTS 5,592,912 A * 1/1997 Uryu ....................... F02N 11/00
74/7 A
9,045,132 B1 * 6/2015 Zhao ................... F02N 11/0837
(Continued)

FOREIGN PATENT DOCUMENTS

DE 102012215497 A1 * 3/2013 .......... F02N 11/0825
EP 2553254 B1 4/2017
(Continued)

*Primary Examiner* — Erin M Piateski
*Assistant Examiner* — Ashley Tiffany Schoech
(74) *Attorney, Agent, or Firm* — Wenderoth, Lind & Ponack, L.L.P.

(57) ABSTRACT

Control circuitry for a vehicle that is configured to perform stop control of an internal combustion engine therein is configured to: stop the internal combustion engine in response to determining based on information indicating a predetermined vehicle state that a predetermined stop condition is satisfied; prevent the internal combustion engine from stopping in response to determining based on the information indicating the vehicle state that the stop condition is satisfied, but determining that a protection condition for a heat generating part that generates heat at the start of the internal combustion engine is satisfied; and in response to determining that a traveling speed of the vehicle reaches a predetermined speed threshold, change the protection condition such that the protection condition becomes more difficult to be satisfied than before the traveling speed of the vehicle reaches the speed threshold.

8 Claims, 6 Drawing Sheets

(51) Int. Cl.
  *F02N 11/08*    (2006.01)
  *G07C 5/10*    (2006.01)
(52) U.S. Cl.
  CPC .... *F02D 2200/501* (2013.01); *F02D 2200/70*
                              (2013.01)
(58) Field of Classification Search
  CPC ......... B60K 6/38; B60W 10/02; B60W 10/06;
          B60W 10/08; B60W 10/26; B60W 20/10;
          B60W 20/15; B60W 20/40; B60W 20/50;
          B60W 2300/36; B60W 2520/10; B60W
          2555/20; B60W 2556/10; B60Y 2306/05;
          B62J 50/30; B62K 2204/00; F02D
          2200/501; F02D 2200/70; F02D 41/042;
          F02N 11/00; F02N 11/04; F02N 11/08;
          F02N 11/0814; F02N 11/0818; F02N
          11/0833; F02N 11/14; F02N 2200/0801;
          F02N 2200/0803; F02N 2200/14; F02N
          2300/20; F02N 2300/2002; G07C 5/10
  See application file for complete search history.

(56)            References Cited

U.S. PATENT DOCUMENTS

| | | | |
|---|---|---|---|
| 2012/0055729 A1* | 3/2012 | Bessho ................... | B60K 5/04 |
| | | | 180/309 |
| 2015/0275787 A1* | 10/2015 | Dufford ............. | B60W 30/188 |
| | | | 701/112 |
| 2018/0258897 A1* | 9/2018 | Leone ................ | F02N 11/0851 |
| 2018/0306157 A1* | 10/2018 | Lee ...................... | B60W 10/30 |
| 2020/0047744 A1* | 2/2020 | Shokaku ............... | B60K 6/485 |
| 2022/0355785 A1* | 11/2022 | Ahren .................. | B60W 20/13 |

FOREIGN PATENT DOCUMENTS

| | | | | |
|---|---|---|---|---|
| JP | 2000018060 A | 1/2000 | | |
| WO | WO-2019125360 A1 * | 6/2019 | ......... | F02N 11/0822 |

* cited by examiner

CONTROL CIRCUITRY FOR A VEHICLE WITH STOP CONTROL OF AN INTERNAL COMBUSTION ENGINE

CROSS-REFERENCE TO RELATED APPLICATIONS

This application claims priority to and the benefit of Japanese Patent Application No. 2023-208831 filed on Dec. 11, 2023, the entire disclosure of which is incorporated herein by reference.

BACKGROUND ART

Field of the Invention

The present disclosure relates to control circuitry and a vehicle which are related to idle reduction.

Description of the Related Art

Japanese Laid-Open Patent Application Publication No. 2000-18060 discloses a technology of canceling engine automatic stop control when the number of times of automatic start is a prescribed number of times or more.

In Japanese Laid-Open Patent Application Publication No. 2000-18060, when the number of times of the automatic start exceeds the prescribed number of times, the engine automatic stop control cannot be executed, and the opportunity of the stop is limited.

SUMMARY OF THE INVENTION

An object of one aspect of the present disclosure is to increase the opportunity of a stop of an internal combustion engine.

Control circuitry according to one aspect of the present disclosure is control circuitry for a vehicle that is configured to perform stop control of an internal combustion engine therein. The control circuitry is configured to: stop the internal combustion engine in response to determining based on information indicating a predetermined vehicle state that a predetermined stop condition is satisfied; prevent the internal combustion engine from stopping in response to determining based on the information indicating the vehicle state that the stop condition is satisfied, but determining that a protection condition for a heat generating part that generates heat at the start of the internal combustion engine is satisfied; and in response to determining that a traveling speed of the vehicle increases and reaches a predetermined speed threshold, change the protection condition such that the protection condition becomes more difficult to be satisfied than before the traveling speed of the vehicle reaches the speed threshold.

The above object, other objects, features, and advantages of the present disclosure will be made clear by the following detailed description with reference to the attached drawings.

DETAILED DESCRIPTION

Hereinafter, an exemplary embodiment of the present disclosure will be described with reference to the drawings. The embodiment described below is a comprehensive or specific example. Among components in the following embodiment, components that are not recited in independent claims which embody the broadest concept of the present disclosure will be described as optional components. The diagrams in the attached drawings are schematic diagrams and are not necessarily strictly drawn. In the diagrams, the same reference signs are used for the substantially identical components, and the repetition of the same explanation may be avoided, or such explanation may be simplified.

Figure 1:
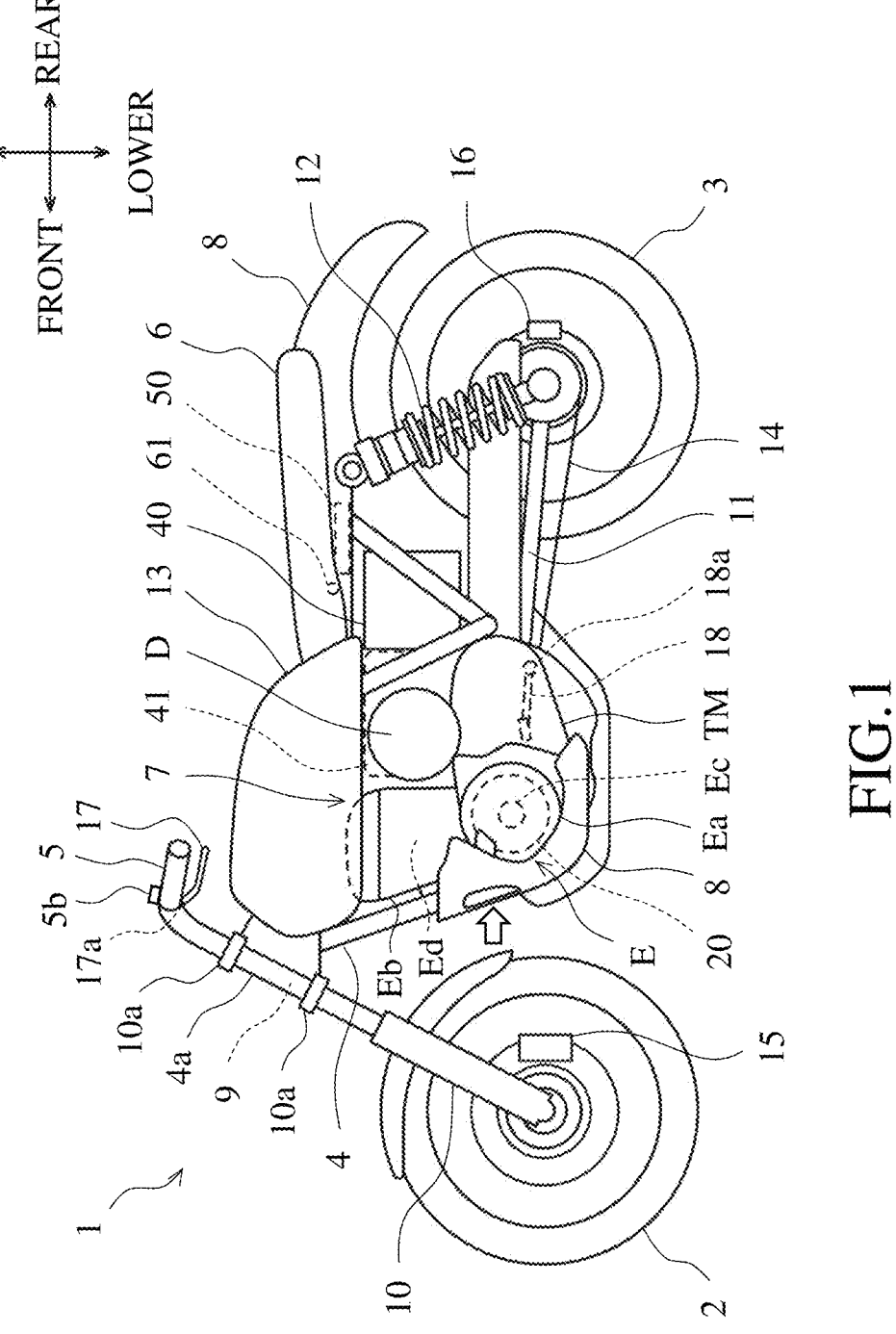
FIG. 1 is a side view showing one example of the configuration of a vehicle according to an exemplary embodiment.

A vehicle 1 according to the exemplary embodiment will be described with reference to FIG. 1. FIG. 1 is a side view showing one example of the configuration of the vehicle 1 according to the exemplary embodiment. In the present embodiment, the vehicle 1 is a movable body on which one or more persons can get and which can move. However, the vehicle 1 is not limited to this. The vehicle 1 may be controlled by a person on the vehicle 1 or may be remotely controlled from an outside of the vehicle 1. The vehicle 1 may include an internal combustion engine. Examples of the vehicle 1 include automobiles and motorcycles. For example, the automobile may include three wheels or more by which the automobile moves. The motorcycle may include three wheels or less by which the motorcycle moves.

The following will describe a motorcycle as the vehicle 1. Therefore, the "vehicle 1" may be referred to as a "motorcycle 1." The motorcycle 1 is a straddled vehicle straddled by a person.

In the present specification and the claims, an upper direction, upward, a lower direction, downward, a front direction, forward, a rear direction, rearward, a left direction, leftward, a right direction, rightward, a lateral direction, and lateral are directions based on the motorcycle 1 located on a horizontal surface. The upper direction and upward indicate directions from the horizontal surface toward the motorcycle 1. The lower direction and downward indicate directions from the motorcycle 1 toward the horizontal surface. The front direction and forward indicate an advancing direction of the motorcycle 1. The rear direction, rearward, the left direction, leftward, the right direction, rightward, the lateral direction, and lateral indicate directions relative to the front direction or the front side.

The motorcycle 1 includes a front wheel 2, a rear wheel 3, a vehicle body frame 4, a handlebar 5, a seat 6, a traveling driving source 7, and outer shell structures 8.

The outer shell structures 8 constitute at least a part of an outer shell of the motorcycle 1 and is exposed to an outside. As the outer shell structure 8, the motorcycle 1 shown in FIG. 1 includes: a front cowl which covers the front side and lateral sides of the traveling driving source 7 and forms a front outer shell of the motorcycle 1; and a rear cowl which extends downward and rearward of the seat 6 and forms a rear outer shell of the motorcycle 1. The outer shell structure 8 may further include a portion which forms the front outer shell in front of the handlebar 5, as the front cowl. The outer shell structures 8 are located such that at least a part of the traveling driving source 7 is exposed to an outside.

The motorcycle 1 further includes a steering shaft 9, front forks 10, a swing arm 11, a rear suspension 12, and a fuel tank 13.

Upper portions of the front forks 10 are coupled to a pair of brackets 10a located so as to be spaced apart from each other in an upper-lower direction. Lower portions of the front forks 10 support the front wheel 2 such that the front wheel 2 is rotatable. The brackets 10a are connected to the steering shaft 9 that supports the handlebar 5. The steering shaft 9 is supported by a head pipe 4a so as to be angularly displaceable. The head pipe 4a is part of the vehicle body frame 4.

The swing arm 11 supports the rear wheel 3, extends in the front-rear direction, and is supported by the vehicle body frame 4 so as to be pivotable. The rear suspension 12 is connected to the swing arm 11 and the vehicle body frame 4.

The fuel tank 13 is located rearward of the handlebar 5. The seat 6 on which a rider is seated is located rearward of the fuel tank 13.

The motorcycle 1 further includes a front brake 15 located at the front wheel 2, a rear brake 16 located at the rear wheel 3, a brake lever 17 located at the handlebar 5, and a brake pedal 18 located at the vehicle body frame 4. The motorcycle 1 includes a structure in which the front brake 15 is actuated by an operation input from the brake lever 17, and also includes a structure in which the rear brake 16 is actuated by an operation input from the brake pedal 18. The motorcycle 1 includes: a brake sensor 17a that is located at the brake lever 17 and detects a brake operation; and a brake sensor 18a that is located at the brake pedal 18 and detects a brake operation. The brake sensors 17a and 18a output detection signals to a below-described electronic control unit 50. The brake pedal 18 may be located at the handlebar 5 as a brake lever.

The traveling driving source 7 is located between the front wheel 2 and the rear wheel 3 and mounted on the vehicle body frame 4. The traveling driving source 7 includes an internal combustion engine E and a drive motor D that is a rotating electrical machine.

Figure 2:
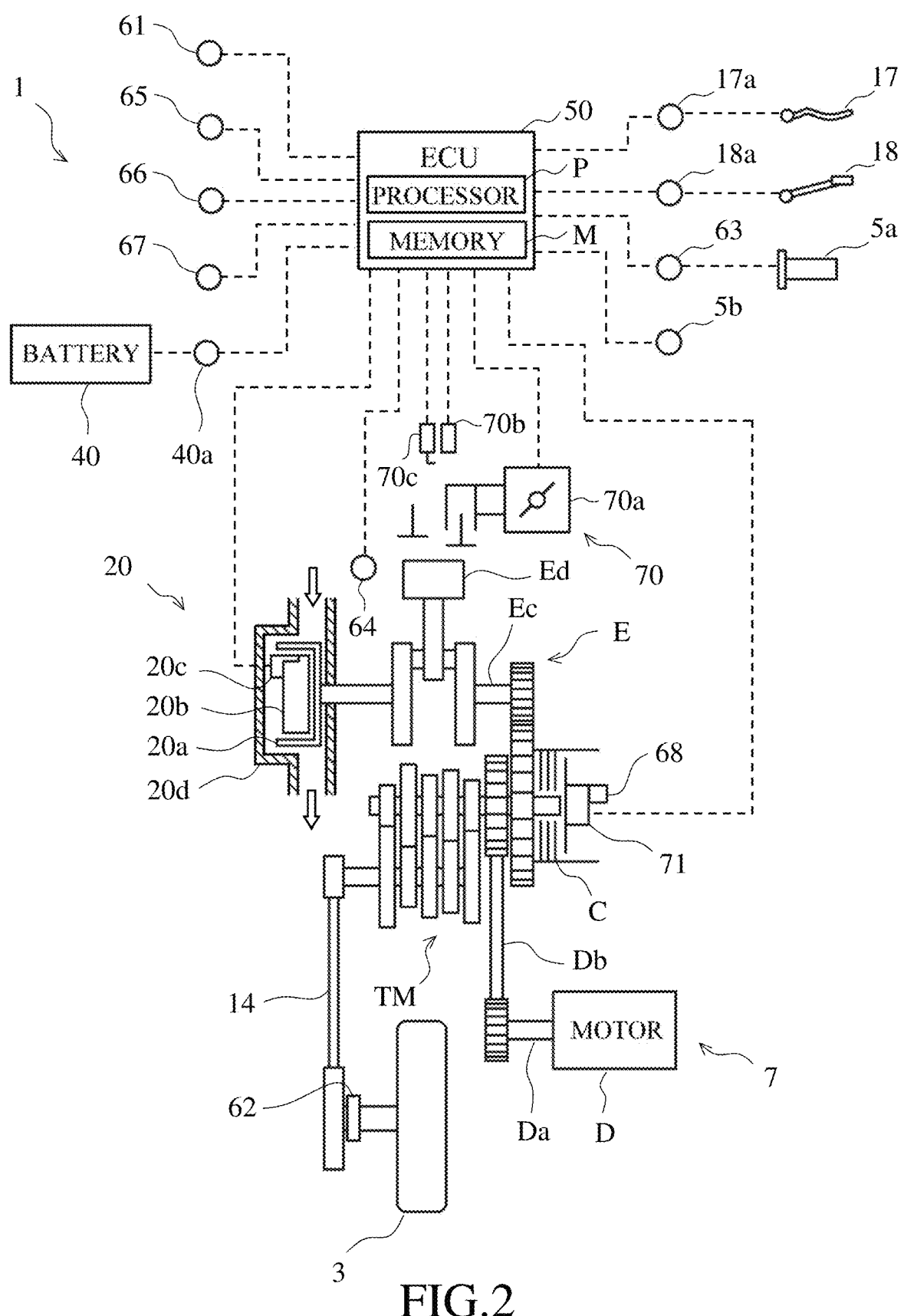
FIG. 2 is a schematic diagram showing one example of a power system of a motorcycle of FIG. 1.

FIG. 2 is a schematic diagram showing one example of a power system of the motorcycle 1 of FIG. 1. As shown in FIGS. 1 and 2, the motorcycle 1 further includes a starter motor 20, a battery 40, and the electronic control unit 50 that controls the motorcycle 1. Hereinafter, the "electronic control unit 50" may be referred to as an "ECU 50." The starter motor 20 is one example of a start electrical structure, and the electronic control unit 50 is one example of control circuitry.

The internal combustion engine E includes: a crankshaft Ec in a crankcase Ea; and one or more pistons Ed which are slidably located in a cylinder block Eb and are connected to the crankshaft Ec so as to be able to transmit driving power to the crankshaft Ec. The internal combustion engine E generates power by repeating combustion explosion of a fuel-air mixture containing fuel and air in a cylinder of the cylinder block Eb. The internal combustion engine E converts a reciprocating movement of the piston Ed by the combustion explosion into a rotational movement of the crankshaft Ec and transmits the rotational power of the crankshaft Ec to the rear wheel 3 that is a driving wheel. One end of the crankshaft Ec is connected to a clutch C and is further connected to an input shaft of a transmission TM through the clutch C so as to be able to transmit power. The clutch C includes a structure that realizes or cuts power transmission between the crankshaft Ec and the transmission TM. An output shaft of the transmission TM transmits the rotational power of the crankshaft Ec to the rear wheel 3 through a power transmitting structure 14, such as a chain or a belt. The clutch C and the transmission TM are one example of a drive structure.

At least a part of the drive motor D is located so as to be exposed to an outside from the outer shell structure 8. The drive motor D includes a motor drive shaft Da that rotates by receiving the supply of electric power. The drive motor D generates electric power by the rotation of the motor drive shaft Da and may supply the electric power to the battery 40. The motor drive shaft Da is connected to the input shaft of the transmission TM through a power transmitting structure Db so as to be able to transmit power. Examples of the power transmitting structure Db may include a chain, a belt, and a gear. The drive motor D receives the supply of the electric power to transmit the rotational power through the transmission TM to the rear wheel 3. The drive motor D generates the electric power in such a manner that the motor drive shaft Da is forcibly rotated by the rear wheel 3 through the transmission TM. The transmission TM includes gears and can change a selected transmission gear ratio by changing the gears through which the power of the internal combustion engine E is transmitted to the rear wheel 3.

The starter motor 20 is connected to the crankshaft Ec so as to be able to transmit its rotational driving power to the crankshaft Ec. In the present embodiment, the starter motor 20 is directly coupled to the other end of the crankshaft Ec or a shaft extending from the other end of the crankshaft Ec. However, the starter motor 20 is not limited to this. In the present embodiment, the starter motor 20 includes a structure that rotates the crankshaft Ec at the same angular velocity as the starter motor 20 without reducing the angular velocity of the rotation of the starter motor 20. However, the starter motor 20 is not limited to this. The starter motor 20 is operated by electric power and forcibly rotates the crankshaft Ec.

When starting the internal combustion engine E, the crankshaft Ec needs to be forcibly rotated by using the starter motor 20. When the starter motor 20 continuously rotates the crankshaft Ec, the internal combustion engine E repeats a suction stroke, a compression stroke, an explosion stroke, and an exhausting stroke, which are set based on a rotation angle position of the crankshaft Ec, in this order. In the internal combustion engine E, the fuel-air mixture supplied into the cylinder is ignited, and the explosion of the fuel-air mixture generates the rotational power that rotates the crankshaft Ec. In the internal combustion engine E, each time the rotational power that rotates the crankshaft Ec is obtained, and the explosion stroke is performed, the ignition of the fuel-air mixture is repeated. Thus, the internal combustion engine E does not require the assist of the starter motor 20 and can continue the generation of the rotational power.

As described above, the starter motor 20 includes a drive function of supplying rotational power to the crankshaft Ec.

Moreover, in the present embodiment, the starter motor 20 is realized as a so-called starter generator motor which includes, in addition to the drive function, a power generator function of generating electric power by being supplied with the rotational power from the crankshaft Ec. Examples of the starter generator include an integrated starter generator (ISG) and an AC generator (ACG). When the starter motor 20 is the starter generator motor, the starter motor 20 also serves as an alternator, and therefore, an alternator may be omitted.

Figure 3:
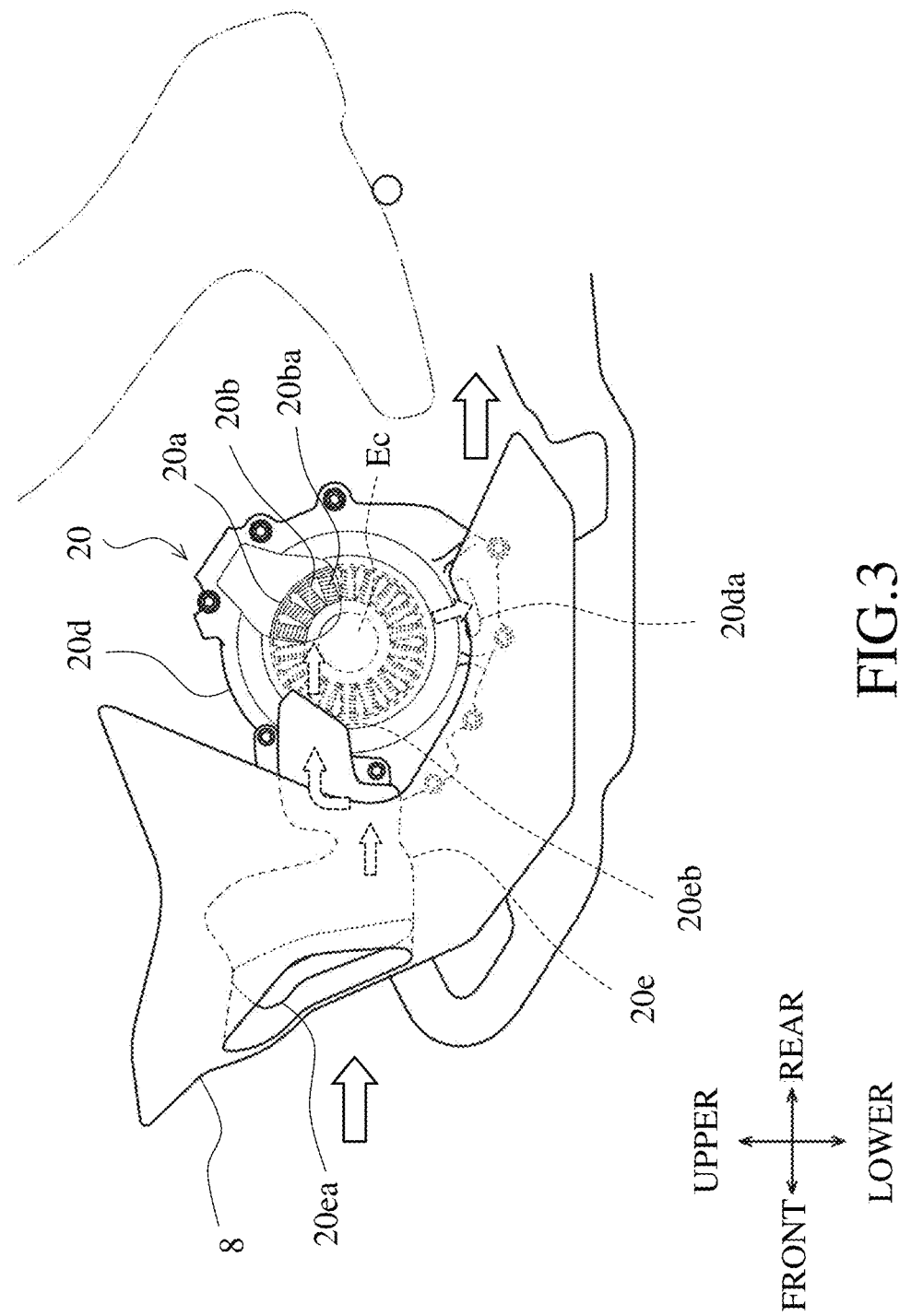
FIG. 3 is a side view showing one example of the configuration including a starter motor of FIG. 1 and its peripheral components.

FIG. 3 is a side view showing one example of the configuration including the starter motor 20 of FIG. 1 and its peripheral components. As shown in FIGS. 2 and 3, the starter motor 20 includes a rotor 20*a*, a stator 20*b*, a rotation sensor 20*c*, and a cover 20*d*. FIG. 3 shows that part of the cover 20*d* is cut out such that an inside of the cover 20*d* is visible.

The rotor 20*a* is connected to the crankshaft Ec such that power can be transmitted therebetween. The starter motor 20 is a rotating electrical machine that can perform conversion from electric energy to mechanical energy and conversion from mechanical energy to electric energy by the rotation of the rotor 20*a*. The starter motor 20 supplies the electric power, generated by the rotation of the rotor 20*a*, to the battery 40.

In the present embodiment, the starter motor 20 includes a structure in which the rotor 20*a* is located outside the stator 20*b*. However, the starter motor 20 may include a structure in which the rotor 20*a* is located inside the stator 20*b*. The stator 20*b* includes a coil portion 20*ba* constituted by windings. The rotor 20*a* includes permanent magnets located so as to surround the coil portion 20*ba* from an outside. Among the rotor 20*a*, the stator 20*b*, and the rotation sensor 20*c*, the cover 20*d* covers at least the stator 20*b*.

The rotation sensor 20*c* detects a rotation amount of the rotor 20*a* and outputs detection signals to the ECU 50. Based on the detection signals of the rotation sensor 20*c*, the ECU 50 controls rotation driving of the rotor 20*a* by electric power and a rotation load applied to the rotor 20*a* when generating electric power by the rotation of the rotor 20*a*. Examples of the rotation sensor 20*c* include an encoder and a Hall sensor.

The starter motor 20 is required to exert high output in order to perform the rotation driving of the crankshaft Ec against reaction force received by the piston Ed in the compression stroke. The starter motor 20 is one of start electrical structures that generate heat at the start of the internal combustion engine E. In the present embodiment, the starter motor 20 rotates the crankshaft Ec such that the angular velocity of the crankshaft Ec becomes equal to the angular velocity of the starter motor 20. Therefore, torque output from the starter motor 20 needs to be increased as compared to a case where the rotational power of the starter motor 20 is transmitted while the angular velocity of the starter motor 20 is reduced. Thus, the starter motor 20 requires large electric power and therefore easily generates heat.

Moreover, in the present embodiment, since the starter motor 20 includes the power generator function in addition to the drive function, the starter motor 20 needs to adopt a structure for improving the power generation efficiency using the power supplied from the crankshaft Ec during traveling. Therefore, it is difficult to make the starter motor 20 include a structure suitable for the drive function. Thus, the start of the starter motor 20 requires larger electric power than a case where the starter motor 20 does not include the power generator function. In the starter motor 20, the coil portion 20*ba* generates large heat by current supply at the start of the internal combustion engine E.

The starter motor 20 includes a cooling structure in which while the motorcycle 1 is traveling, a heat generating portion is directly or indirectly cooled by traveling wind that is received by the motorcycle while the motorcycle 1 is traveling. In the present embodiment, the starter motor 20 includes a structure that guides the traveling wind to the coil portion 20*ba* that is the heat generating portion. Therefore, the traveling wind contacts the coil portion 20*ba* and removes the heat of the coil portion 20*ba* to lower the temperature of the coil portion 20*ba*.

The starter motor 20 may further include a duct 20*e* that introduces air to the inside of the cover 20*d*. The duct 20*e* is located forward of the cover 20*d*. The duct 20*e* is located inside the outer shell structure 8 and extends in the front-rear direction. An upstream end 20*ea* of the duct 20*e* is open at a front portion of the outer shell structure 8 as the front cowl toward an outside. A downstream end 20*eb* of the duct 20*e* is open at a front portion of the cover 20*d* toward the inside of the cover 20*d*. A rear portion of the cover 20*d* includes an opening 20*da*.

As shown by outlined arrows in FIG. 3, the traveling wind during the traveling of the motorcycle 1 flows from the upstream end 20*ea* into the duct 20*e* and is introduced into the cover 20*d* by the duct 20*e*. The traveling wind directly performs heat exchange with the coil portion 20*ba* in the cover 20*d* to cool the coil portion 20*ba*, flows through the opening 20*da*, flows to an outside of the cover 20*d*, and flows rearward. The traveling wind can flow through the inside of the cover 20*d*, and in this process, directly performs heat exchange with the coil portion 20*ba*. The cover 20*d* and the duct 20*e* are one example of a cooling heat exchange structure.

In the present embodiment, at least a part of the cover 20*d* that covers the coil portion 20*ba* in the starter motor 20 is located so as to be exposed to an outside from the front cowl that is the outer shell structure 8. Since the cover 20*d* is located as above, the traveling wind contacts the cover 20*d* and removes the heat of the cover 20*d*, and the temperature of the cover 20*d* lowers. Therefore, the temperature of the coil portion 20*ba* in the cover 20*d* also lowers.

The battery 40 includes a secondary battery that can charge and discharge electric power. The battery 40 accumulates the electric power generated by the power generator function of the starter motor 20 and the power generator function of the drive motor D and supplies the accumulated electric power to electrical components that use the electric power in the motorcycle 1. Each of the starter motor 20 and the drive motor D is one of the electrical components that are supplied with the electric power from the battery 40. Charging and discharging of the battery 40 are controlled by control circuitry 40*a* for the battery 40, and the control circuitry 40*a* serves as a voltage sensor, detects a voltage value of the battery 40, and outputs the voltage value to the ECU 50. The battery 40 generates heat at the time of the charging and discharging of the electric power. The battery 40 discharges electric power at the start of the internal combustion engine E to generate heat, and therefore, is one of heat generating parts.

As shown in FIG. 1, the motorcycle 1 includes electric circuitry 41. A part of the electric circuitry 41 electrically connects the starter motor 20 and the drive motor D to the battery 40, and another part of the electric circuitry 41 electrically connects the battery 40 to the electrical components of the motorcycle 1. The electric circuitry 41 includes: a converter that convers AC power, generated by the power generator function of the starter motor 20 and the power generator function of the drive motor D, into DC power that can be stored in the battery 40; an inverter that converts the DC power, stored in the battery 40, into AC power that can be used by the electrical components; and the like. Each of the converter and the inverter generates heat when converting the electric power. The amount of heat generated by each of the converter and the inverter increases as the amount of change per unit time of the amount of electric power to be converted increases. When the starter motor 20 is realized by an AC motor, the inverter generates heat at the start of the internal combustion engine E, and therefore, is one of the heat generating parts. A part of the electric circuitry 41 that conducts a current from the battery 40 to the starter motor 20 also generates heat at the start of the internal combustion engine E, and therefore, is one of the heat generating parts.

As shown in FIGS. 1 and 2, the motorcycle 1 may include a seating sensor 61, such as a pressure-sensitive sensor, which is located at the seat 6 and detects whether or not a person is seated on the seat 6. The seating sensor 61 outputs detection signals to the ECU 50.

The motorcycle 1 further includes a vehicle speed sensor 62 located at the rear wheel 3. The vehicle speed sensor 62 detects a rotational speed of the rear wheel 3 and outputs detection signals to the ECU 50. The vehicle speed sensor 62 or the ECU 50 detects a vehicle speed of the motorcycle 1 from the rotational speed. Examples of the vehicle speed sensor 62 include rotation sensors, such as an encoder. The vehicle speed sensor 62 may be located at the front wheel 2 and detect the rotational speed of the front wheel 2. The vehicle speed sensor 62 may be realized by Global Navigation Satellite System (GNSS) that detects the position of the motorcycle 1 on the earth.

The motorcycle 1 may include a throttle position sensor 63 that detects an operating position of a throttle grip 5a located at the handlebar 5. The throttle position sensor 63 outputs detection signals to the ECU 50. The detection signals of the operating position of the throttle grip 5a are signals that command an opening degree of a throttle valve. The ECU 50 causes a below-described throttle actuator 70a to drive the throttle valve in accordance with the detection signals of the throttle position sensor 63.

The motorcycle 1 may include a temperature sensor 64 that detects a temperature state of the internal combustion engine E. One or more temperature sensors 64 may be located so as to detect the temperature of cooling water that cools the internal combustion engine E, the temperature of lubricating oil that lubricates the inside of the internal combustion engine E, or both of these temperatures. The temperature sensor 64 may be located at a channel of the cooling water or a channel of the lubricating oil. The temperature sensor 64 outputs detection signals to the ECU 50.

The motorcycle 1 may include an outside air temperature sensor 65 that detects an outside air temperature. The outside air temperature sensor 65 may be located so as to be exposed from the outer shell structure 8 or may be located inside the outer shell structure 8. The outside air temperature sensor 65 may be located at an intake air channel so as to detect an intake air temperature of the internal combustion engine E. The outside air temperature sensor 65 outputs detection signals to the ECU 50.

The motorcycle 1 may include a side stand sensor 66. The side stand sensor 66 detects whether a side stand that supports the motorcycle 1 in an inclined state is located at a storage position or a pulled-out position for support. The side stand sensor 66 outputs detection signals to the ECU 50.

The motorcycle 1 may include a gear position sensor 67. The gear position sensor 67 detects a command that specifies the gear ratio selected in the transmission TM. The gear position sensor 67 outputs detection signals to the ECU 50. For example, the gear position sensor 67 detects an operation to a shift pedal, a shift lever, or a shift button. The ECU 50 causes an actuator of the transmission TM to change the gears, which transmit the power of the internal combustion engine E to the rear wheel 3, in accordance with the detection signals of the gear position sensor 67.

The motorcycle 1 may include a clutch sensor 68. The clutch sensor 68 detects whether the clutch C is in an engaged state or a disengaged state. The clutch sensor 68 outputs detection signals to the ECU 50. The ECU 50 causes a below-described clutch actuator 71 to drive the clutch C based on the detection signals of the clutch sensor 68.

The ECU 50 includes control circuitry. The ECU 50 may include a microcomputer including a processor P, such as a CPU (Central Processing Unit) or a DSP (Digital Signal Processor), and a memory M. The ECU 50 may include a clock that measures time. Examples of the memory include: a volatile memory, such as a RAM (Random Access Memory); and a non-volatile memory, such as a ROM (Read-Only Memory). Some or all of the functions of the ECU 50 may be realized in such a manner that the CPU uses the RAM as a work memory and executes a program recorded in the ROM. Some or all of the functions of the ECU 50 may be realized by dedicated hardware circuitry, such as electronic circuitry or integrated circuitry. Some or all of the functions of the ECU 50 may be realized by the combination of the above software function and the hardware circuitry. Communication among various equipment equipped with the motorcycle 1, such as the ECU 50, the starter motor 20, various actuators and various sensors may be communication through an in-vehicle network, such as a CAN (Controller Area Network).

The ECU 50 controls the internal combustion engine E, the drive motor D, and the starter motor 20. The ECU 50 controls the operation of one or more internal combustion engine actuators 70 that control the driving of the internal combustion engine E. One or more internal combustion engine actuators 70 include at least the throttle actuator 70a, a fuel injection actuator 70b, and an ignition actuator 70c. The throttle actuator 70a drives the throttle valve that adjusts the flow rate of the air flowing into the cylinder block Eb. The fuel injection actuator 70b includes a fuel injection valve that injects the fuel into the cylinder block Eb. The ignition actuator 70c includes an ignition plug that ignites the fuel-air mixture containing the air and the fuel in the cylinder block Eb.

The ECU 50 adjusts torque output from the internal combustion engine E, in accordance with detection signals of sensors which are included in the motorcycle 1 and detect a vehicle state. For example, the ECU 50 controls the operations of the throttle actuator 70a, the fuel injection actuator 70b, and the ignition actuator 70c such that the output torque becomes torque corresponding to the rotational speed of the crankshaft Ec, the vehicle speed, and the throttle opening degree.

The ECU 50 controls the operation of the clutch actuator 71 that controls the driving of the clutch C. The clutch actuator 71 drives the clutch C to shift the state of the clutch C between the engaged state and the disengaged state. When the clutch C is in the engaged state, the power of the internal combustion engine E and the drive motor D is transmitted to the rear wheel 3. When the clutch C is in the disengaged state, the power of the internal combustion engine E is not transmitted to the rear wheel 3, and the power of the drive motor D is transmitted to the rear wheel 3.

The ECU 50 controls the motorcycle 1 as a hybrid vehicle. In the present embodiment, the motorcycle 1 is a parallel hybrid vehicle but may be a different type of hybrid vehicle, such as a split hybrid vehicle. The ECU 50 drives one or both of the internal combustion engine E and the drive motor D in accordance with the traveling state of the motorcycle 1 to cause the motorcycle 1 to travel. For example, the ECU 50 controls at least a HEV mode among the HEV mode, a charging mode, and an EV mode.

The motorcycle 1 may include an operation key 5b, by which the HEV mode, the charging mode, or the EV mode is selected, at the handlebar 5 or the like. The ECU 50 may control the clutch actuator 71, the internal combustion engine actuators 70, and the drive motor D to switch a driving state of the motorcycle 1 to a driving state corresponding to the mode selected by the operation key 5b, and may cause the motorcycle 1 to drive in this driving state. The ECU 50 may autonomously determine the mode to be executed from the HEV mode, the charging mode, and the EV mode based on, for example, operation efficiencies of the internal combustion engine E and the drive motor D. The ECU 50 may switch the driving state of the motorcycle 1 to the driving state corresponding to the mode determined by the ECU 50 itself, and may cause the motorcycle 1 to drive in this driving state.

The ECU 50 controls the HEV mode in which the internal combustion engine E and the drive motor D are controlled. In this case, the ECU 50 causes the clutch actuator 71 to set the clutch C to the engaged state. In some cases, in the HEV mode, the ECU 50 drives only the drive motor D to cause the motorcycle 1 to travel.

For example, in the HEV mode, the ECU 50 may perform control of driving only the drive motor D or both of the internal combustion engine E and the drive motor D when the motorcycle 1 starts traveling. When the motorcycle 1 is accelerating at low speed, the ECU 50 may perform control of driving only the drive motor D or both of the internal combustion engine E and the drive motor D. When the motorcycle 1 is accelerating at middle speed or high speed, the ECU 50 may perform control of driving only the internal combustion engine E or both of the internal combustion engine E and the drive motor D. When the motorcycle 1 is traveling in a cruising state, the ECU 50 may perform control of driving the drive motor D or the internal combustion engine E. The ECU 50 autonomously stops and starts the internal combustion engine E in accordance with the above switching of the driving state.

The ECU 50 may be configured to control the charging mode. In the charging mode, the ECU 50 drives only the internal combustion engine E regardless of the traveling state of the motorcycle 1 and causes the drive motor D to serve as a power generator. In this case, the ECU 50 causes the clutch actuator 71 to set the clutch C to the engaged state. The drive motor D is forcibly rotated by the internal combustion engine E to generate electric power and supplies the generated electric power to the battery 40.

The ECU 50 may be configured to control the EV mode in which only the drive motor D is controlled. In this case, the ECU 50 causes the clutch actuator 71 to set the clutch C to the disengaged state. In the EV mode, the ECU 50 drives only the drive motor D to cause the motorcycle 1 to travel. However, when the voltage value of the battery 40 becomes a predetermined value or less, the ECU 50 may shift the EV mode to the HEV mode or the charging mode and autonomously start the internal combustion engine E.

Moreover, the ECU 50 includes an automatic stop function of autonomously stopping the internal combustion engine E regardless of the operation of the rider in response to the ECU 50 determining, based on information indicating the vehicle state of the motorcycle 1, that a predetermined stop condition is satisfied. For example, when the motorcycle 1 is in a movement stop state, in which the motorcycle 1 is in a stop state without traveling, for a predetermined period of time, the ECU 50 controls the throttle actuator 70a, the fuel injection actuator 70b, and the ignition actuator 70c to stop the internal combustion engine E, i.e., performs automatic stop of the internal combustion engine E. The information indicating the vehicle state of the motorcycle 1 contains detection results of various sensors included in the motorcycle 1. Examples of such sensors may include the seating sensor 61, the vehicle speed sensor 62, the throttle position sensor 63, the temperature sensor 64, the outside air temperature sensor 65, the control circuitry 40a for the battery 40, the brake sensors 17a and 18a, and the side stand sensor 66.

The ECU 50 includes an automatic start function of autonomously starting the internal combustion engine E by controlling the throttle actuator 70a, the fuel injection actuator 70b, and the ignition actuator 70c in response to the ECU 50 determining, in the stop state of the internal combustion engine E based on the information indicating the vehicle state of the motorcycle 1, that a predetermined start condition is satisfied. For example, the ECU 50 may start the internal combustion engine E when the ECU 50 receives a command of starting the traveling of the motorcycle 1.

The ECU 50 stores the predetermined stop condition, a predetermined protection condition, and the predetermined start condition in the memory M. The ECU 50 stops the internal combustion engine E in response to the ECU 50 determining based on the information from various sensors that the stop condition stored in the memory M is satisfied. The ECU 50 starts the internal combustion engine E in response to the ECU 50 determining based on the information from various sensors that the start condition stored in the memory M is satisfied. For example, the ECU 50 includes an idle reduction function of, while the motorcycle 1 is in a traveling stop state or is traveling only by the drive motor D, stopping the internal combustion engine E that is in an idling state. The idling state is a state in which while the throttle position sensor 63 is not outputting a signal of commanding the opening of the throttle valve, the ECU 50 drives the internal combustion engine E at a predetermined rotational speed.

While the internal combustion engine E is running, the ECU 50 determines based on the information indicating the vehicle state of the motorcycle 1 whether or not the stop condition is satisfied. In response to the ECU 50 determining that the stop condition is satisfied, the ECU 50 stops the internal combustion engine E.

The information indicating the vehicle state of the motorcycle 1 which is related to the stop condition may include traveling stop information for detecting or estimating the traveling stop state of the motorcycle 1. The information indicating the vehicle state may include stop operation information for detecting or estimating a traveling stop operation of the rider. The information indicating the vehicle state may include motor operatable information indicating a state where the starter motor 20 can operate.

The traveling stop information can be acquired by using one or more of a position sensor and a distance sensor which are realized by using one or more of the vehicle speed sensor 62 of the front wheel 2 or the rear wheel 3, a gyro sensor included in the motorcycle 1, and the GNSS. Preferably, when a state where the traveling speed is zero continues for a predetermined period of time or more, the ECU 50 may determine that the motorcycle 1 is in the traveling stop state.

The stop operation information can be acquired by using one or more of the throttle position sensor 63, the brake sensors 17a and 18a, and the side stand sensor 66.

The motor operatable information may include battery operatable information regarding one or more of a charging amount that is a remaining amount of the battery 40, the temperature of the battery 40, and the degree of deterioration of the battery 40. The charging amount of the battery 40 may be determined based on the voltage of the battery 40. The degree of deterioration of the battery 40 may be determined based on the number of times of the charging and discharging of the battery 40. The battery operatable information may be information indicating a result of estimating whether or not the battery 40 can supply enough current to rotate the crankshaft Ec by the starter motor 20. The motor operatable information may include battery operation information. The battery operation information is information by which the temperature of the starter motor 20 can be estimated based on an operation history of the starter motor 20 operated by the battery 40. The battery operation information may include information regarding a start history of the internal combustion engine E started by the starter motor 20.

The stop condition is a condition for stopping the internal combustion engine E in a state where the supply of the electric power to the ECU 50 is maintained. For example, a state where the electric power is supplied to the ECU 50 is a state where an ignition power supply is in an on state, but may be a state where an accessory power supply is in an on state. On the other hand, a state where the electric power is not supplied to the ECU 50 is a state where the ignition power supply or the accessory power supply is in an off state. However, a dark current may be supplied to the ECU 50 for a security monitoring function, a clock function, and the like.

For example, the stop condition may include a condition regarding one or more of a moving state of the motorcycle 1, an operating state of the motorcycle 1 operated by the rider, an electric power state of the motorcycle 1, and a state of equipment included in the motorcycle 1.

For example, the stop condition includes one or more of: a first stop determination condition that a state where the detection result of the vehicle speed sensor 62 indicates the vehicle speed of zero is maintained for a predetermined period of time or more; a second stop determination condition that the detection result of the throttle position sensor 63 indicates a state where non-opening of the throttle is commanded; and a third stop determination condition that the voltage value detected by the control circuitry 40a for the battery 40 is a predetermined voltage value or more. In the present embodiment, the stop condition includes all of these stop determination conditions.

For example, the predetermined period of time in which the vehicle speed is zero may be a period of time within a range of one second or more and less than ten seconds. The predetermined voltage value regarding the battery 40 may be a voltage value of the battery 40 which is required for the stop state of the internal combustion engine E in accordance with the stop condition.

The first stop determination condition is a condition regarding the state of a movement stop of the motorcycle 1. The second stop determination condition is a condition regarding the state of a driving operation. The third stop determination condition is a condition regarding the state of the battery 40. That the stop condition is satisfied denotes that all the stop determination conditions in the stop condition are satisfied. In the present embodiment, that the stop condition is satisfied denotes that all of the first stop determination condition, the second stop determination condition, and the third stop determination condition are satisfied.

In addition to the above first to third stop determination conditions, the stop condition may include one or more of fourth to seventh stop determination conditions described below. The fourth stop determination condition is a condition that the detection result of the temperature sensor 64 is a predetermined temperature or more. The predetermined temperature of the fourth stop determination condition may be a temperature corresponding to the temperature of the internal combustion engine E in a warm-up state. The fifth stop determination condition is a condition that the detection results of the brake sensors 17a and 18a indicate brake activation operation performed by one or both of the brake lever 17 and the brake pedal 18. The sixth stop determination condition is a condition that the detection result of the side stand sensor 66 indicates that the side stand is at the storage position. The seventh stop determination condition is a condition that the detection result of the seating sensor 61 indicates that a person is seated on the seat 6.

In the present embodiment, even when the stop condition is satisfied, the ECU 50 determines based on the information indicating the vehicle state of the motorcycle 1 whether or not the protection condition for the heat generating part is satisfied. In response to the ECU 50 determining that the protection condition for the heat generating part is satisfied, the ECU 50 prevents the internal combustion engine E from stopping. To be specific, the ECU 50 continues the running of the internal combustion engine E. When the ECU 50 determines that the stop condition is satisfied, and the protection condition is not satisfied, the ECU 50 executes the stop of the internal combustion engine E.

The information indicating the vehicle state of the motorcycle 1 which is related to the protection condition may include temperature estimation information for estimating the temperature of the heat generating part. The temperature estimation information may include a detected value acquired from a sensor that detects the temperature of the heat generating part. The temperature estimation information may include a detected value acquired from a sensor that detects a current flowing through the heat generating part. The temperature estimation information may include information related to a start history of the internal combustion engine E started by using the starter motor 20.

The protection condition is a condition for protecting the heat generating part from excessive heat generation and is related to the temperature estimation information. The protection condition may include a condition regarding one or more of an estimated temperature of the heat generating part and the frequency of the temperature increase of the heat generating part. For example, the protection condition may include a first protection determination condition that the estimated temperature of the heat generating part is more than an allowable upper limit. The protection condition may include a second protection determination condition that the number of times of the start of the internal combustion engine E in a predetermined period of time is a predetermined value or more. In the present embodiment, the protection condition includes the first protection determination condition and the second protection determination condition. When one or more of the first protection determination condition and the second protection determination condition are satisfied, the protection condition is satisfied.

For example, the ECU 50 estimates the temperature of the heat generating part based on the temperature estimation information. In response to the ECU 50 determining that the estimated temperature of the heat generating part is more than the allowable upper limit, i.e., the first protection determination condition is satisfied, the ECU 50 continues the running of the internal combustion engine E to suppress an increase in the opportunity of the start of the internal combustion engine E after the stop of the internal combustion engine E. For example, in response to the ECU 50 determining that the number of times of the start of the internal combustion engine E in a predetermined period of time is a predetermined value or more, i.e., the second protection determination condition is satisfied, the ECU 50 continues the running of the internal combustion engine E. In both cases, the heat generating part can be prevented from generating heat and increasing in temperature by the start operation assumed after the stop of the internal combustion engine E. Therefore, the heat generating part may be protected from heat.

In the stop state of the internal combustion engine E in a state where the electric power is supplied to the ECU 50, the ECU 50 determines based on the information indicating the vehicle state of the motorcycle 1 whether or not the start condition is satisfied. When the start condition is satisfied, the ECU 50 starts the internal combustion engine E.

The information indicating the vehicle state of the motorcycle 1 which is related to the start condition may include traveling start operation information for detecting or estimating the execution of the operation of starting the traveling by the rider. The traveling start operation information can be acquired by using detection signals from one or more of operation element sensors, such as the throttle position sensor 63, the brake sensors 17*a* and 18*a*, the side stand sensor 66, the clutch sensor 68, and the gear position sensor 67.

The information indicating the vehicle state of the motorcycle 1 which is related to the start condition may include the motor operatable information. The motor operatable information may include the battery operatable information regarding one or more of the charging amount that is the remaining amount of the battery 40 and the temperature of the battery 40.

The start condition is a condition for starting the internal combustion engine E that is in the stop state in a state where the electric power is supplied to the ECU 50. For example, the start condition may include a condition regarding one or more of the moving state of the motorcycle 1, the operating state of the motorcycle 1 operated by the rider, the electric power state of the motorcycle 1, and the states of the equipment included in the motorcycle 1. For example, the start condition may include a first start determination condition indicating that the detection signals of various operation element sensors are related to the execution of the operation of starting the traveling by the rider. The start condition may include a second start determination condition that the charging amount of the battery 40 is equal to or less than such a charging amount that it is expected that the traveling of the motorcycle 1 only by the drive motor D is difficult. In the present embodiment, the start condition includes the first start determination condition and the second start determination condition. When one or more of the first start determination condition and the second start determination condition are satisfied, the start condition is satisfied.

For example, in response to the ECU 50 determining based on the detection signals of the operation element sensors that the operation of starting the traveling has been executed by the rider, i.e., the first start determination condition is satisfied, the ECU 50 starts the internal combustion engine E. In response to the ECU 50 determining based on the voltage value of the battery 40 which is acquired from the control circuitry 40*a* for the battery 40 that the traveling only by the drive motor D is difficult, i.e., the second start determination condition is satisfied, the ECU 50 starts the internal combustion engine E.

The ECU 50 is configured to be able to change the protection condition in accordance with the vehicle state of the motorcycle 1. The ECU 50 stores a change condition in the memory M as a condition for determining the change of the protection condition. In the present embodiment, the change condition is a condition for changing the protection condition in accordance with the vehicle speed of the motorcycle 1. However, the change condition is not limited to this. In response to the ECU 50 determining that the change condition is satisfied, the ECU 50 changes the protection condition. The ECU 50 changes the protection condition in accordance with the change condition such that the protection condition becomes more difficult to be satisfied or easier to be satisfied. In the present embodiment, ECU 50 changes the protection condition in accordance with the change condition such that the protection condition becomes more difficult to be satisfied.

The protection condition as the above-described second protection determination condition is a condition associated with the start history of the internal combustion engine E. The ECU 50 stores in the memory M, the start history of the internal combustion engine E and a first history threshold preset for the start history. In the present embodiment, the ECU 50 increments the number of times of the start operation of the internal combustion engine E by counting the start operation each time the internal combustion engine E performs the start operation, from the start of the electric power supply to the ECU 50 while the state where the electric power is supplied to the ECU 50 is maintained. To be specific, the ECU 50 counts the number of times of the start operation. The ECU 50 stores a count number of the start operation as the start history in the memory M. Moreover, the ECU 50 may associate a time point of the start operation that is an increment target with the count of the start operation and also store the time point as the start history in the memory M. Moreover, the ECU 50 may associate the information indicating the vehicle state of the motorcycle 1 and acquired by the ECU 50, with the above time point and also store the information as the start history in the memory M. The first history threshold may be a threshold set for the count number.

When the electric power is not supplied to the ECU 50, the ECU 50 may change the count number stored in the memory M. The ECU 50 may reset the count number to zero, or the ECU 50 may change the count number so that the count number becomes smaller as a period of time in which the electric power is not supplied becomes longer.

The count number of the start operation of the internal combustion engine E includes at least the count number of the start operation executed by the ECU 50 with respect to the internal combustion engine E that is in the stop state in a state where the electric power is being supplied to the ECU 50. The count number of the start operation of the internal combustion engine E may further include the count number of the start operation executed by the ECU 50 in accordance with the operation of a key by the rider or the operation of a start switch by the rider with respect to the internal combustion engine E that is in the stop state in a state where the electric power is not being supplied to the ECU 50.

The protection condition that is a condition associated with the start history of the internal combustion engine E is based on the count number of the start operation of the internal combustion engine E and the first history threshold. The protection condition includes a condition that the count number of the start operation of the internal combustion engine E is the first history threshold or more. The first history threshold may be set to a value within a range from several times to several tens of times. For example, the first history threshold may be set to a value within a range of 10 times or more and less than 100 times, but may be a value that is 100 times or more.

The change condition includes a first change determination condition. The first change determination condition is a condition that the traveling speed of the motorcycle 1 is a first speed threshold or more. The first speed threshold may be set based on a coolable speed that is a speed at which a cooling effect of cooling the heat generating part by the traveling wind to an allowable upper limit temperature or less is obtained.

For example, the first speed threshold may be the coolable speed or a speed close to the coolable speed. When the first speed threshold is higher than the coolable speed, the heat generating part can receive a cooling action by the traveling wind in a process in which the speed changes from the coolable speed to the first speed threshold. For example, the first speed threshold may be set within a speed range of 30 km/h or more. Preferably, the first speed threshold may be set within a speed range of 40 km/h or more. Such first speed threshold may be higher than the coolable speed.

For example, the first speed threshold may be set to a traveling speed higher than a traveling speed at the time of traffic congestion. For example, the first speed threshold may be set within a speed range of 10 km/h or more.

It is preferable to set the first speed threshold to such a speed that when the heat generating part is the starter motor 20 as the starter generator, and the starter motor 20 generates heat by the power generator function, the starter motor 20 is cooled to the allowable upper limit temperature or less.

In response to the ECU 50 determining that the traveling speed of the motorcycle 1 increases and reaches the first speed threshold, i.e., the first change determination condition is satisfied, the ECU 50 performs the change of the protection condition which corresponds to increasing the first history threshold. To be specific, the ECU 50 changes the protection condition such that the protection condition becomes more difficult to be satisfied. In the present embodiment, when the traveling speed of the motorcycle 1 becomes the first speed threshold or more even for a second, the ECU 50 changes the protection condition. As another example, when the traveling speed of the motorcycle 1 is the first speed threshold or more for a first period of time, the ECU 50 may change the protection condition. The first period of time may be set to a period of less than one second, several seconds, several tens of seconds, or the like.

The ECU 50 changes the protection condition so as to increase a difference between the count number and the first history threshold by reducing the count number stored in the memory M. In the present embodiment, the ECU 50 resets the count number, stored in the memory M, to zero. However, the ECU 50 may reduce the count number so that the count number becomes smaller as the traveling speed of the motorcycle 1 is higher. When the motorcycle 1 travels at the first speed threshold or more, the traveling wind cools the coil portion 20ba of the starter motor 20 that is the heat generating part. Therefore, the heat generating part can be cooled to a temperature range in which the internal combustion engine E can be started.

The change of the protection condition is not limited to the above. The ECU 50 may change the protection condition so as to increase the difference between the count number and the first history threshold by increasing the first history threshold. Thus, the ECU 50 can change the protection condition such that the protection condition becomes more difficult to be satisfied.

Figure 4:
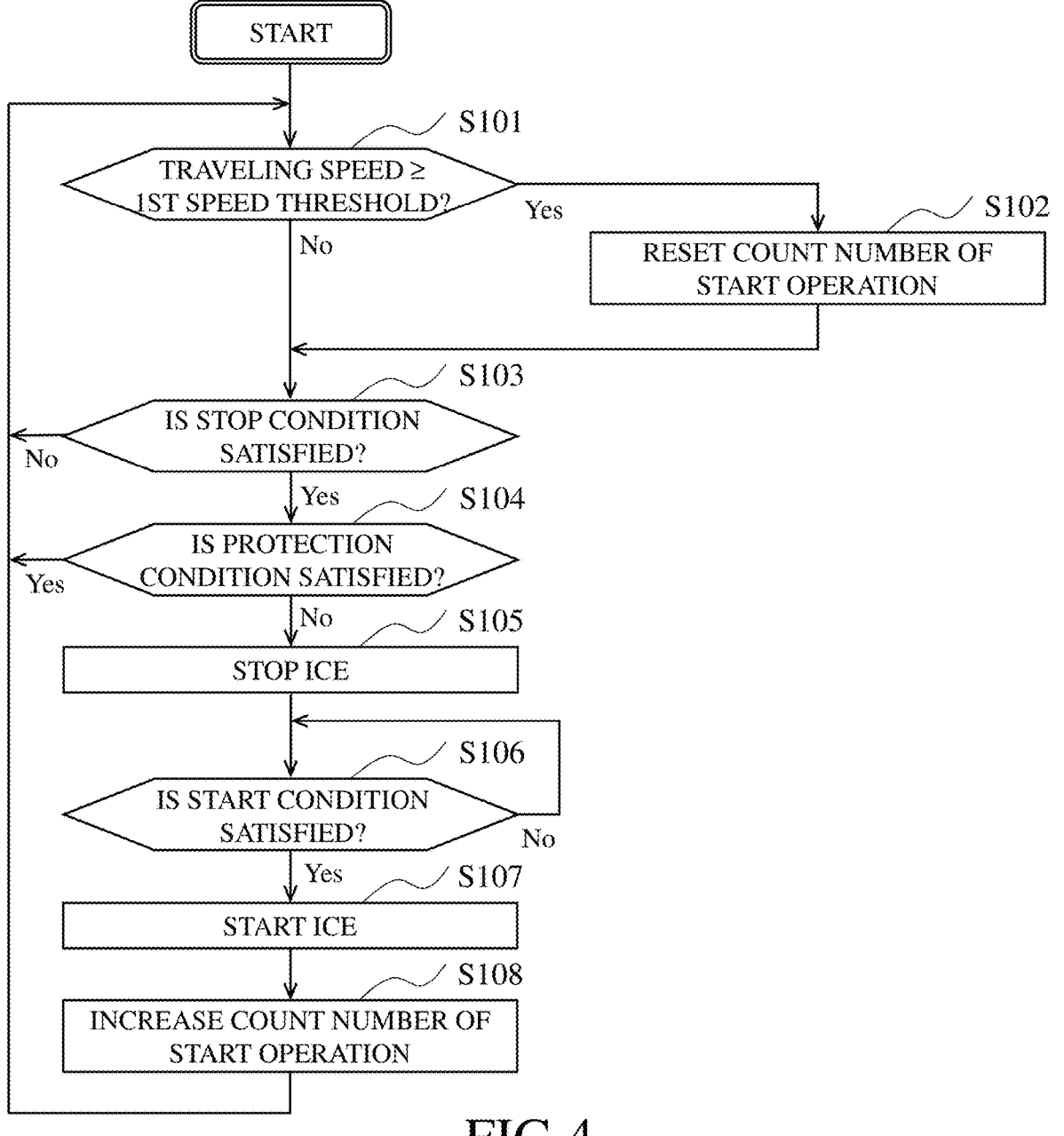
FIG. 4 is a flowchart showing one example of operations performed when an ECU according to the embodiment stops and starts an internal combustion engine.

Referring to FIG. 4, the following will describe one example of the operation of the ECU 50 according to the embodiment that includes the stop operation and start operation of the internal combustion engine E. FIG. 4 is a flowchart showing one example of the operation of stopping and starting the internal combustion engine E by the ECU 50 according to the embodiment and shows the operation of the ECU 50 in a state where the electric power supply is maintained. In the drawings, the "internal combustion engine" may be referred to as an "ICE."

In Steps S101 to S108 described below, the ECU 50 acquires the detection results of various sensors of the motorcycle 1 at any time as the information indicating the vehicle state of the motorcycle 1 and stores the detection results in the memory M. For example, the ECU 50 acquires the detection result at a predetermined time interval.

In Step S101, the ECU 50 determines whether or not the traveling speed of the motorcycle 1 is the first speed threshold or more. When the traveling speed is the first speed threshold or more (Yes in Step S101), the ECU 50 proceeds to Step S102. When the traveling speed is less than the first speed threshold (No in Step S101), the ECU 50 proceeds to Step S103.

In Step S102, the ECU 50 changes the count number of the start operation of the internal combustion engine E which is stored in the memory M, and stores the changed count number in the memory M. In this example, the ECU 50 resets the count number to zero. Then, the ECU 50 proceeds to Step S103.

In Step S103, the ECU 50 determines whether or not the stop condition is satisfied. When the stop condition is satisfied (Yes in Step S103), the ECU 50 proceeds to Step S104. When the stop condition is not satisfied (No in Step S103), the ECU 50 returns to Step S101.

In Step S104, the ECU 50 determines whether or not the protection condition is satisfied. When the protection condition is satisfied (Yes in Step S104), the ECU 50 returns to Step S101. When the protection condition is not satisfied (No in Step S104), the ECU 50 proceeds to Step S105. For example, regarding whether or not the protection condition is satisfied, the ECU 50 detects whether or not the count number of the start operation of the internal combustion engine E which is stored in the memory M is the first history threshold or more. To be specific, the ECU 50 detects whether or not the stop of the internal combustion engine E is allowed.

In Step S105, the ECU 50 controls the actuator 70 to stop the internal combustion engine E.

Next, in Step S106, the ECU 50 determines whether or not the start condition is satisfied. When the start condition is satisfied (Yes in Step S106), the ECU 50 proceeds to Step S107. When the start condition is not satisfied (No in Step S106), the ECU 50 repeats Step S106.

In Step S107, the ECU 50 controls the actuator 70 to start the internal combustion engine E.

Next, in Step S108, the ECU 50 increases, by one, the count number of the start operation of the internal combustion engine E which is stored in the memory M, i.e., increments the count number. The ECU 50 stores the increased count number in the memory M. Then, the ECU 50 returns to Step S101 and repeats Step S101 and the subsequent steps.

When the ignition power supply is turned off, the ECU 50 may terminate a series of steps that are Steps S101 to S108. In the operation of the ECU 50, not all of Steps S101 to S108 are essential, and the order of Steps S101 to S108 may be changed. For example, the order of Step S103 regarding the stop condition and Step S104 regarding the protection condition may be reversed.

Figure 5:
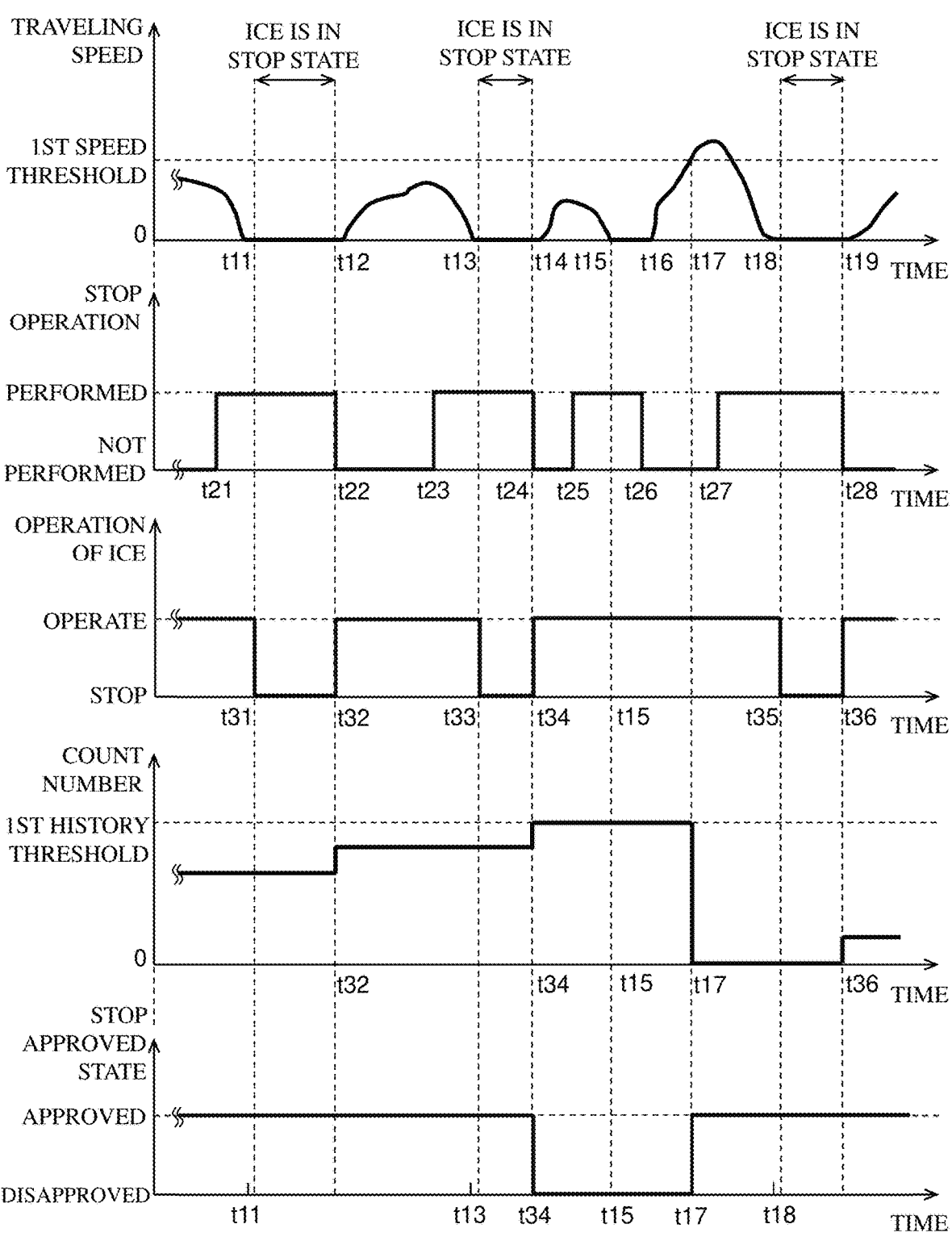
FIG. 5 is a diagram showing one example of a relationship among a temporal change of a traveling speed of the motorcycle, a temporal change of a stop operation, a temporal change of an operating state of the internal combustion engine, a temporal change of a count number of a start operation of the internal combustion engine, and a temporal change of a stop approved/disapproved state of the internal combustion engine.

Referring to FIG. 5, the following will describe a relation between the stop operation and start operation of the internal combustion engine E by the ECU 50 and the state of the motorcycle 1. FIG. 5 is a diagram showing one example of a relation among a temporal change of the traveling speed of the motorcycle 1, a temporal change of the stop operation, a temporal change of the operating state of the internal combustion engine E, a temporal change of the count number of the start operation of the internal combustion engine E, and a temporal change of a stop approved/disapproved state of the internal combustion engine E.

For example, while the motorcycle 1 is traveling, the rider decelerates and stops the motorcycle 1 by inputting a throttle off operation to the throttle grip 5a and inputting a brake operation to the brake lever 17 and the brake pedal 18. In FIG. 5, the rider performs the stop operation four times at time points t21, t23, t25, and t27. The motorcycle 1 stops at time points t11, t13, t15, and t18 which are respectively after the time points t21, t23, t25, and t27.

The throttle position sensor 63 continuously detects throttle off operation from the time points t21, t23, t25, and t27, and the brake sensors 17a and 18a continuously detect the brake operation from the time points t21, t23, t25, and t27. The throttle off operation is an operation of commanding non-opening of the throttle valve. The brake operation is an operation of commanding the activation of one or both of the front brake 15 and the rear brake 16.

The ECU 50 determines at each of the time points t11, t13, t15, and t18 whether or not the stop condition and the protection condition are satisfied. In this example, that the stop condition is satisfied denotes that the first stop determination condition regarding the state of the movement stop of the motorcycle 1, the second stop determination condition regarding the state of the driving operation, and the fifth stop determination condition regarding the brake activation operation are satisfied. That the protection condition is satisfied denotes that the second protection determination condition regarding the number of times of the start of the internal combustion engine E is satisfied.

At each of the time points t11 and t13, the ECU 50 determines that the stop condition is satisfied, and determines that the stop approved/disapproved state of the internal combustion engine E based on the protection condition is an approved state. At each of the time point t31 after the time point t11 and the time point t33 after the time point t13, the ECU 50 stops the internal combustion engine E. As a result of the start of the internal combustion engine E immediately before each of the time points t11 and t13, the count number of the start operation of the internal combustion engine E is less than the first history threshold, and the protection condition is not satisfied. Therefore, the ECU 50 sets the stop approved/disapproved state to the approved state and continues this setting.

At the time point t15, the ECU 50 determines that the stop condition is satisfied, and determines that the stop approved/disapproved state of the internal combustion engine E is a disapproved state. Thus, the ECU 50 continues the running of the internal combustion engine E. As a result of the start of the internal combustion engine E at the time point t34 which is the start immediately before the time point t15, the count number of the start operation reaches the first history threshold, and the protection condition is satisfied. Therefore, the ECU 50 sets the stop approved/disapproved state to the disapproved state and continues this setting.

At the time point t18, the ECU 50 determines that the stop condition is satisfied, and determines that the stop approved/disapproved state of the internal combustion engine E is the approved state. At the time point t35 after the time point t18, the ECU 50 stops the internal combustion engine E. At the time point t17 before the time point t18, the ECU 50 detects that the traveling speed of the motorcycle 1 reaches the first speed threshold, and the ECU 50 resets the count number of the start operation of the internal combustion engine E, which is stored in the memory M, to zero. Since the protection condition is not satisfied, the ECU 50 sets the stop approved/disapproved state to the approved state and continues this setting.

During the stop of the internal combustion engine E, the ECU 50 determines at each of the time point t32 after the time point t31, the time point t34 after the time point t33, and the time point t36 after the time point t35 that the start condition is satisfied. In this example, that the start condition is satisfied denotes that the first start determination condition is satisfied, the first start determination condition indicating that the detection signals of the throttle position sensor 63 and the brake sensors 17a and 18a are related to the traveling start operation of the rider. In this case, the throttle position sensor 63 detects a throttle on operation that commands the opening of the throttle valve, and the brake sensors 17a and 18a detect no input to the brake lever 17 and the brake pedal 18.

As above, each time a state where the stop condition is satisfied and the protection condition is not satisfied occurs, the ECU 50 stops the internal combustion engine E. Each time the start condition is satisfied during the stop of the internal combustion engine E, the ECU 50 starts the internal combustion engine E.

Modified Example 1

Modified Example 1 of the embodiment will be described. The ECU 50 according to Modified Example 1 stores the change determination conditions in the memory M and changes the protection condition in accordance with the satisfied change determination condition. The ECU 50 may change the protection condition either such that the protection condition becomes more difficult to be satisfied or such that the protection condition becomes easier to be satisfied. In this modified example, differences from the embodiment will be described, and the same explanations as the embodiment are suitably omitted.

In addition to the first change determination condition, the ECU 50 according to this modified example stores one or more second change determination conditions as the change determination conditions in the memory M. The one or more second change determination conditions may include one or more among an outside air temperature condition regarding an outside air temperature and one or more history conditions regarding the start history. In this modified example, the one or more second change determination conditions include the outside air temperature condition and the history condition.

The outside air temperature condition is a condition that a temperature range corresponding to the outside air temperature detected by the outside air temperature sensor 65 changes. That the outside air temperature condition is satisfied denotes that the temperature range corresponding to the outside air temperature changes. The temperature ranges are preset and stored in the memory M. The ECU 50 changes the protection condition in accordance with the temperature range corresponding to the outside air temperature. The temperature ranges may be set for every 1° C., several ° C., 10° C., 10 and several ° C., or any combination thereof.

When the outside air temperature condition is satisfied, for example, the ECU 50 may change the protection condition such that the protection condition corresponds to the temperature range corresponding to the outside air temperature. For example, the first history thresholds, the first speed thresholds or both of them, which are related to the protection condition, are preset so as to correspond to the temperature ranges and are stored in the memory M. As the temperature range becomes lower, the first history threshold may be set to a larger value, and the first speed threshold may be set to a smaller value. The ECU 50 determines one or both of the first history threshold and the first speed threshold as a value or values corresponding to the temperature range corresponding to the outside air temperature.

When the outside air temperature condition is satisfied, for example, the ECU 50 may change the protection condition in response to the temperature range corresponding to the outside air temperature shifting due to the change of the outside air temperature. In this case, when the temperature range corresponding to the outside air temperature shifts to a higher temperature range in a second period of time, the ECU 50 may change the protection condition such that the protection condition becomes easier to be satisfied. Moreover, when the temperature range shifts to a lower temperature range in the second period of time, the ECU 50 may change the protection condition such that the protection condition becomes more difficult to be satisfied. The ECU 50 may increase or decrease one or more of the count number, the first history threshold, and the first speed threshold, which are stored in the memory M, in accordance with the shift of the temperature range. For example, when the temperature range shifts to the lower temperature range, the ECU 50 may perform one or more of decreasing the count number, increasing the first history threshold, and decreasing the first speed threshold. When the temperature range shifts to the higher temperature range, the ECU 50 may perform one or more of increasing the count number, decreasing the first history threshold, and increasing the first speed threshold.

The second period of time may be set to a certain period of time or may be set based on a time period between the start operations of the internal combustion engine E which are adjacent to each other in terms of time. For example, in the former case, the second period of time may be set to several minutes, several tens of minutes, or the like. In the latter case, the second period of time may be set to: a most recent time period that is a time period from the most recent start operation until the present time; a between-operations time period that is a time period between two adjacent start operations; a total time period that is a total of two or more of the most recent time period and one or more between-operations time periods; or the like. The total time period may include all of the time periods between the start operations counted in the count number stored in the memory M. The ECU 50 may execute the combination of: the change of the protection condition which corresponds to the temperature range corresponding to the outside air temperature; and the change of the protection condition which corresponds to the shift of the temperature range corresponding to the outside air temperature, the shift of the temperature range corresponding to the change of the outside air temperature.

The history condition may include one or more of: a first history determination condition regarding the time interval between the start operations of the internal combustion engine E; second and third history determination conditions regarding the traveling speed of the motorcycle 1; a fourth history determination condition regarding a time it takes to perform the start operation of the internal combustion engine E; a fifth history determination condition regarding a load required for the start of the internal combustion engine E; and a sixth history determination condition regarding the number of times of the start operation of the internal combustion engine E per unit time. In this modified example, the history condition includes the first to sixth history determination conditions.

The first history determination condition is a condition that a first time interval is a first time threshold or more. The first time interval is based on the time interval between the start operations of the internal combustion engine E which are adjacent to each other in terms of time. For example, the first time interval may be set to: a most recent time interval that is a time interval from the most recent start operation until the present time; a between-operations time interval that is a time interval between two adjacent start operations; a statistic of the time interval which is an average value, a maximum value, a minimum value, or a median of two or more of the most recent time interval and one or more between-operations time intervals; or the like. The two or more time intervals may include all of the time intervals between the start operations counted in the count number stored in the memory M.

For example, the first time threshold may be set to such a time that when the time interval between the start operations of the internal combustion engine E is the first time threshold or more, a temperature increase of the heat generating part may be suppressed, or the temperature of the heat generating part may lower. In response to the ECU 50 determining that the first history determination condition is satisfied, the ECU 50 decreases the count number stored in the memory M to change the protection condition such that the protection condition becomes more difficult to be satisfied. When the time interval between the start operations increases, the temperature increase of the heat generating part may be suppressed, and therefore, the protection condition can be set so as to relax the temperature protection.

The second history determination condition is a condition that the traveling speed of the motorcycle 1 in a third period of time is a second speed threshold or less. The second speed threshold is lower than the first speed threshold. For example, the second speed threshold may be a speed corresponding to the traveling speed in traffic congestion. For example, the second speed threshold may be set within a speed range of more than 0 km/h and 10 km/h or less or within a speed range of more than 0 km/h and 15 km/h or less. The third period of time is set longer than the first period of time. The third period of time may be set to a certain period of time or may be set based on the time period between the start operations of the internal combustion engine E which are adjacent to each other in terms of time. For example, in the former case, the third period of time may be set to several tens of seconds, several minutes, or the like. In the latter case, the third period of time may be set to: the most recent time period; the between-operations time period; the total time period that is the total of two or more of the most recent time period and one or more between-operations time periods; or the like. The total time period may include all of the time periods between the start operations counted in the count number stored in the memory M.

The traveling speed to be compared with the second speed threshold may be an average value, a maximum value, a minimum value, or a median of the traveling speed in the third period of time. In response to the ECU 50 determining that the second history determination condition is satisfied, the ECU 50 increases the count number stored in the memory M to change the protection condition such that the protection condition becomes easier to be satisfied. When the motorcycle 1 continuously travels at low speed, such as the second speed threshold or less, the heat generating part may increase in temperature, and therefore, it is preferable to set the protection condition so as to make the temperature protection strict.

The third history determination condition is a condition that the traveling speed of the motorcycle 1 in a fourth period of time is a third speed threshold or more and less than the first speed threshold. The third speed threshold is lower than the first speed threshold and higher than the second speed threshold. The fourth period of time is set longer than the first period of time. The fourth period of time may be set to a certain period of time or may be set based on the time period between the start operations of the internal combustion engine E which are adjacent to each other in terms of time. For example, in the former case, the fourth period of time may be set to several tens of seconds, several minutes, or the like. In the latter case, the fourth period of time may be set to: the most recent time period; the between-operations time period; the total time period that is the total of two or more of the most recent time period and one or more between-operations time periods; or the like. The total time period may include all of the time periods between the start operations counted in the count number stored in the memory M. The fourth period of time may be equal to the third period of time.

The traveling speed to be compared with the third speed threshold may be an average value, a maximum value, a minimum value, or a median of the traveling speed in the fourth period of time. In response to the ECU 50 determining that the third history determination condition is satisfied, the ECU 50 decreases the count number stored in the memory M to change the protection condition such that the protection condition becomes more difficult to be satisfied. When the motorcycle 1 continuously travels at a speed that is the third speed threshold or more, the temperature increase of the heat generating part may be suppressed, or the heat generating part may be cooled, and therefore, the protection condition can be set so as to relax the temperature protection.

The fourth history determination condition is a condition that the time it takes to perform the start operation of the internal combustion engine E is a second time threshold or more. For example, the second time threshold may be set to such a time that when the time it takes to perform the start operation of the internal combustion engine E is the second time threshold or more, the heat generating part may increase in temperature. The time to be compared with the second time threshold is a time it takes to perform the most recent start operation of the internal combustion engine E. However, the time to be compared with the second time threshold is not limited to this. For example, the time to be compared with the second time threshold may be an average value, a maximum value, a minimum value, or a median of respective times it takes to perform two or more start operations including the most recent start operation. The two or more start operations may include all of the start operations counted in the count number stored in the memory M. In response to the ECU 50 determining that the fourth history determination condition is satisfied, the ECU 50 increases the count number stored in the memory M to change the protection condition such that the protection condition becomes easier to be satisfied. When the time it takes to perform the start operation of the internal combustion engine E increases, the heat generating part may increase in temperature, and therefore, it is preferable to set the protection condition so as to make the temperature protection strict.

The fifth history determination condition is a condition that the load required for the start of the internal combustion engine E is a first load threshold or more. One example of the load required for the start of the internal combustion engine E is a voltage applied to the starter motor 20. For example, the first load threshold may be set to such a voltage that when a voltage applied to the starter motor 20 in the start operation of the internal combustion engine E is the first load threshold or more, the starter motor 20, the battery 40, or the electric circuitry 41 may increase in temperature. The load to be compared with the first load threshold is a load required for the most recent start of the internal combustion engine E. However, the load to be compared with the first load threshold is not limited to this. For example, the load to be compared with the first load threshold may be an average value, a maximum value, a minimum value, or a median of respective loads required for two or more starts including the most recent start. The two or more starts may include all of the starts counted in the count number stored in the memory M. In response to the ECU 50 determining that the fifth history determination condition is satisfied, the ECU 50 increases the count number stored in the memory M to change the protection condition such that the protection condition becomes easier to be satisfied. When the load required for the start of the internal combustion engine E is high, and the voltage applied to the starter motor 20 is high, the heat generating part may increase in temperature, and therefore, it is preferable to set the protection condition so as to make the temperature protection strict.

The sixth history determination condition is a condition that the count number that is the number of times of the start operation of the internal combustion engine E per unit time is a second history threshold or more. The second history threshold may be smaller than the first history threshold. For example, the second history threshold may be set to such number of times that when the number of times of the start operation of the internal combustion engine E per unit time is the second history threshold or more, the heat generating part may overheat. The count number per unit time to be compared with the second history threshold may be a count number per unit time which is calculated from part of the count number stored in the memory M or the entire count number stored in the memory M. The part of the count number may include the count of two or more start operations and may include the count of the most recent start operation. In response to the ECU 50 determining that the sixth history determination condition is satisfied, the ECU 50 increases the count number stored in the memory M to change the protection condition such that the protection condition becomes easier to be satisfied. When the frequency of the start operation of the internal combustion engine E increases, the heat generating part may easily increase in temperature, and therefore, it is preferable to set the protection condition so as to make the temperature protection strict.

As described above, in response to the ECU 50 determining that the first change determination condition is satisfied, the ECU 50 changes the protection condition such that the protection condition is set so as to relax the temperature protection. Moreover, in response to the ECU 50 determining that the second change determination condition including one or more of the first to sixth history determination conditions and the outside air temperature condition is satisfied, the ECU 50 can change the protection condition in accordance with the satisfied condition such that the protection condition is set so as to relax the temperature protection or so as to make the temperature protection strict.

Figure 6:
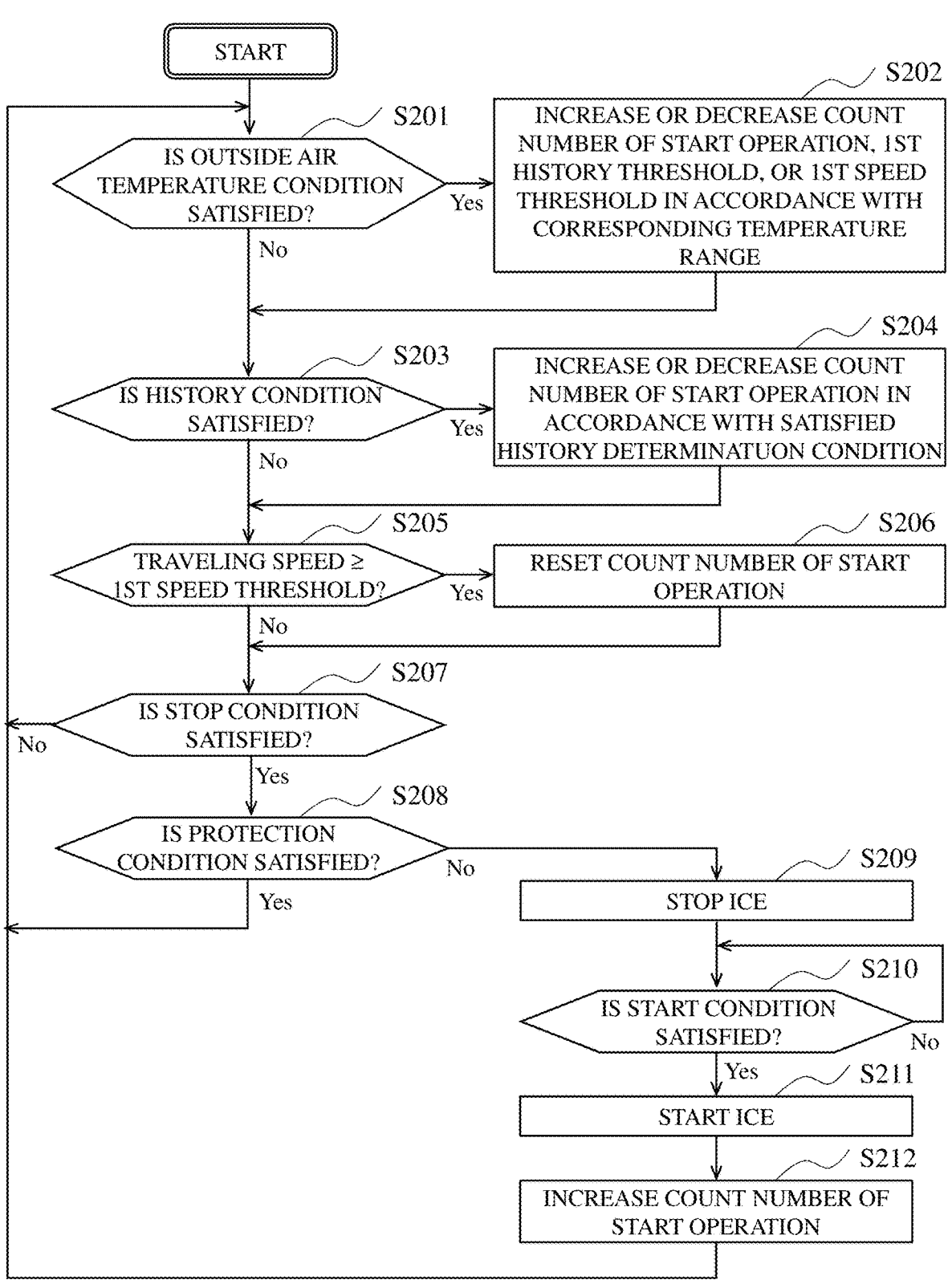
FIG. 6 is a flowchart showing one example of operations performed when the ECU according to Modified Example 1 stops and starts the internal combustion engine.

Referring to FIG. 6, the stop operation and start operation of the internal combustion engine E of the ECU 50 according to this modified example will be described. FIG. 6 is a flowchart showing one example of the operation of stopping and starting the internal combustion engine E by the ECU 50 according to Modified Example 1 and shows the operation of the ECU 50 in a state where electric power supply is maintained. In the example of FIG. 4, the ECU 50 changes the protection condition based on the first change determination condition regarding the traveling speed. However, in the example of FIG. 6, the ECU 50 changes the protection condition based on the first change determination condition and the second change determination condition. In this example, the second change determination condition includes the outside air temperature condition and the history condition.

As with the embodiment, in Steps S201 to S212 described below, the ECU 50 acquires the detection results of various sensors of the motorcycle 1 at any time as the information indicating the vehicle state of the motorcycle 1 and stores the detection results in the memory M.

In Step S201, the ECU 50 determines by using the information indicating the vehicle state whether or not the outside air temperature condition is satisfied. When the outside air temperature condition is satisfied (Yes in Step S201), the ECU 50 proceeds to Step S202. When the outside air temperature condition is not satisfied (No in Step S201), the ECU 50 proceeds to Step S203.

In Step S202, in accordance with the change of the temperature range corresponding to the outside air temperature, the ECU 50 changes the count number of the start operation of the internal combustion engine E, the first history threshold, or the first speed threshold, which are stored in the memory M, so as to increase or decrease the count number, the first history threshold, or the first speed threshold, and stores the changed count number, the changed first history threshold, or the changed first speed threshold in the memory M. Then, the ECU 50 proceeds to Step S203.

In Step S203, the ECU 50 determines by using the information indicating the vehicle state and the information stored in the memory M whether or not the history condition is satisfied. The history determination conditions as detection targets are one or more of the first to sixth history determination conditions. In this example, the history determination conditions as the detection targets are all of the first to sixth history determination conditions. When at least one of the history determination conditions is satisfied (Yes in Step S203), the ECU 50 proceeds to Step S204. When the history determination conditions are not satisfied at all (No in Step S203), the ECU 50 proceeds to Step S205.

In Step S204, the ECU 50 changes the count number of the start operation of the internal combustion engine E which is stored in the memory M so as to increase or decrease the count number in accordance with the satisfied determination history condition, and stores the changed count number in the memory M. Then, the ECU 50 proceeds to Step S205.

As with Step S101 of FIG. 4, when the ECU 50 determines in Step S205 that the traveling speed of the motorcycle 1 is the first speed threshold or more (Yes in Step S205), the ECU 50 proceeds to Step S206. When the ECU 50 determines that the traveling speed is less than the first speed threshold (No in Step S205), the ECU 50 proceeds to Step S207.

As with Step S102 of FIG. 4, in Step S206, the ECU 50 resets the count number of the start operation of the internal combustion engine E which is stored in the memory M and stores the reset count number in the memory M. Then, the ECU 50 proceeds to Step S207.

The ECU 50 executes Steps S207 to S212 in the same manner as Steps S103 to S108 of FIG. 4.

When the ignition power supply is turned off, the ECU 50 may terminate a series of steps that are Steps S201 to S212. In the operation of the ECU 50, not all of Steps S201 to S212 are essential, and the order of Steps S201 to S212 may be changed. For example, the order of Steps S201, S203, and S205 may be changed, and the order of Steps S207 and S208 may be reversed. For example, the ECU 50 may execute one or more of Steps S201, S203, and S205. In Step S203, the ECU 50 may use one or more of the first to sixth history determination conditions. As with Steps S203 and S204, the ECU 50 may perform processing of changing the count number based on the history condition after Step S212.

Modified Example 2

Modified Example 2 of the embodiment will be described. The ECU 50 according to Modified Example 2 includes a condition regarding the drive motor D in the change condition for determining the change of the protection condition. In this modified example, differences from the embodiment and Modified Example 1 will be described, and the same explanations as the embodiment or Modified Example 1 are suitably omitted.

In this modified example, the change condition for determining the change of the protection condition includes a third change determination condition regarding the operation of the drive motor D. The ECU 50 stores in the memory M the change condition including the first and third change determination conditions or the change condition including the first, second, and third change determination conditions.

The third change determination condition includes one or more motor conditions regarding the drive motor D. The one or more motor conditions may include one or more of a first motor condition regarding the frequency of switching between single driving of the drive motor D and non-single driving of the drive motor D, second and third motor conditions regarding the time period of the single driving of the drive motor D, and a fourth motor condition regarding the time period of the charging mode. In this modified example, the third change determination condition includes the first to fourth motor conditions.

The first motor condition is a condition that the number of times per unit time of the shift from the single driving state of the drive motor D to the non-single driving state of the drive motor D in a fifth period of time is a first shift threshold or more. The first shift threshold may be set to such number of times that when the internal combustion engine E is started in response to each of the shifts that occur with the frequency that is the first shift threshold or more, the heat generating part may overheat. The above shift includes: the shift from the single driving state of the drive motor D to the single driving state of the internal combustion engine E; and the shift from the single driving state of the drive motor D to a combination driving state that is a state where both of the internal combustion engine E and the drive motor D drive. The above shift may include: the shift in the HEV mode; and the shift between the HEV mode and the EV mode.

The fifth period of time may be set to: the most recent time period from the most recent start operation of the internal combustion engine E until the present time; the between-operations time period between two start operations which are adjacent to each other in terms of time; the total time period that is the total of two or more of the most recent time period and one or more between-operations time periods; or the like. The total time period may include all of the time periods between the start operations counted in the count number stored in the memory M.

In response to the ECU 50 determining that the first motor condition is satisfied, the ECU 50 increases the count number stored in the memory M to change the protection condition such that the protection condition becomes easier to be satisfied. When the frequency of the shift increases, the frequency of the start operation of the internal combustion engine E increases, and the heat generating part may increase in temperature. Therefore, it is preferable to set the protection condition so as to make the temperature protection strict.

The second motor condition is a condition that the time period of the single driving of the drive motor D in a sixth period of time is a third time threshold or more. The third time threshold may be set to such a time period that when the drive motor D continuously drives in a time period that is the third time threshold or more, the heat generating part, such as the drive motor D, the battery 40, or the electric circuitry 41, may increase in temperature. The sixth period of time may be set to: the most recent time period; the between-operations time period; the total time period that is the total of two or more of the most recent time period and one or more between-operations time periods; or the like. The total time period may include all of the time periods between the start operations counted in the count number stored in the memory M.

In response to the ECU 50 determining that the second motor condition is satisfied, the ECU 50 increases the count number stored in the memory M to change the protection condition such that the protection condition becomes easier to be satisfied. At the time of the single driving of the drive motor D, the drive motor D, the battery 40, or the electric circuitry 41 may increase in temperature. When the time period of the single driving of the drive motor D increases, these heat generating parts may increase in temperature, and therefore, the protection condition can be set so as to make the temperature protection strict.

The third motor condition is a condition that the time period of the single driving of the drive motor D in a seventh period of time is a fourth time threshold or less. The fourth time threshold may be smaller than the third time threshold and may be set to such a time period that when the internal combustion engine E is in a stop state and the drive motor D continuously drives in a time period that is the fourth time threshold or less, the temperature of the heat generating part, such as the drive motor D, the battery 40, or the electric circuitry 41, can be prevented from increasing or can be lowered. The seventh period of time may be set to: the most recent time period; the between-operations time period; the total time period that is the total of two or more of the most recent time period and one or more between-operations time periods; or the like. The total time period may include all of the time periods between the start operations counted in the count number stored in the memory M.

In response to the ECU 50 determining that the third motor condition is satisfied, the ECU 50 decreases the count number stored in the memory M to change the protection condition such that the protection condition becomes more difficult to be satisfied. When the time period of the single driving of the drive motor D is not long, the temperature decrease of the internal combustion engine E influences the heat generating part more significantly than the temperature increase of the drive motor D, and therefore, the protection condition can be set so as to relax the temperature protection.

The fourth motor condition is a condition that the time period of the charging mode in an eighth period of time is a fifth time threshold or more. The fifth time threshold may be set to such a time period that when the drive motor D in the charging mode continuously charges the battery 40 in a time period that is the fifth time threshold or more, the heat generating part, such as the drive motor D, the battery 40, or the electric circuitry 41, may increase in temperature. The eighth period of time may be set to: the most recent time period; the between-operations time period; the total time period that is the total of two or more of the most recent time period and one or more between-operations time periods; or the like. The total time period may include all of the time periods between the start operations counted in the count number stored in the memory M.

In response to the ECU 50 determining that the fourth motor condition is satisfied, the ECU 50 increases the count number stored in the memory M to change the protection condition such that the protection condition becomes easier to be satisfied. In the charging mode, the drive motor D, the battery 40, or the electric circuitry 41 may increase in temperature. When the time period of the charging mode increases, these heat generating parts may increase in temperature, and therefore, it is preferable to set the protection condition so as to make the temperature protection strict.

The ECU 50 may be configured to perform the operation of this modified example based on the operation of the ECU 50 in the embodiment or Modified Example 1. For example, when performing the operation based on the operation shown in FIG. 4 related to the embodiment, the ECU 50 may execute the processing of determining before Step S101 or between Steps S101 and S103 whether or not the one or more motor conditions are satisfied. In this case, the ECU 50 determines by using the information indicating the vehicle state and the information stored in the memory M whether or not the one or more motor conditions are satisfied. The one or more motor conditions as a determination target include one or more of the first to fourth motor conditions. In this example, the one or more motor conditions as the determination target include all of the first to fourth motor conditions.

When at least one of the motor conditions is satisfied, the ECU 50 changes the count number of the start operation of the internal combustion engine E, which is stored in the memory M, so as to increase or decrease the count number in accordance with the satisfied motor condition, and stores the changed count number in the memory M. Then, the ECU 50 performs processing toward Step S103. When the motor conditions are not satisfied at all, the ECU 50 performs processing toward Step S103.

For example, when performing the operation based on the operation shown in FIG. 6 related to Modified Example 1, the ECU 50 may execute the processing of determining before Step S201 or between two of Steps S201, S203, S205, and S207 whether or not the one or more motor conditions are satisfied.

When at least one of the motor conditions is satisfied, the ECU 50 changes the count number of the start operation of the internal combustion engine E, which is stored in the memory M, so as to increase or decrease the count number in accordance with the satisfied motor condition, and performs processing toward Step S207. When the motor conditions are not satisfied at all, the ECU 50 performs processing toward Step S207.

The ECU 50 according to this modified example can change the protection condition in accordance with the temperature increase of the heat generating part due to the operation of the drive motor D.

Modified Example 3

Modified Example 3 of the embodiment will be described. When a predetermined condition is satisfied while the motorcycle 1 is traveling, the ECU 50 according to Modified Example 3 stops the internal combustion engine E. In this modified example, differences from the embodiment and Modified Examples 1 and 2 will be described, and the same explanations as the embodiment, Modified Example 1, or Modified Example 2 are suitably omitted.

The ECU 50 according to this modified example adds to the count number of the start operation, one or more of the start operation of the internal combustion engine E while the motorcycle 1 is traveling, the start operation of the internal combustion engine E when the mode shifts to the charging mode, and the start operation of the internal combustion engine E when the EV mode shifts to the HEV mode. However, the ECU 50 does not have to add these start operations to the count number. The ECU 50 adds the above start operation to increment the count number of the start operation which is stored in the memory M.

When the motorcycle 1 is in the movement stop state in the HEV mode, in response to the ECU 50 determining that an in-stopping stop condition, which is the same as the stop condition of the embodiment, is satisfied, the ECU 50 stops the internal combustion engine E. In this modified example, that the in-stopping stop condition is satisfied denotes that at least the first stop determination condition regarding the state of the movement stop of the motorcycle 1, the second stop determination condition regarding the state of the driving operation, and the third stop determination condition regarding the state of the battery 40 are satisfied. However, that the in-stopping stop condition is satisfied is not limited to this.

When the motorcycle 1 is in the movement stop state in the HEV mode, in response to the ECU 50 determining that an in-stopping start condition, which is the same as the start condition of the embodiment, is satisfied, the ECU 50 starts the internal combustion engine E. In this modified example, that the in-stopping start condition is satisfied denotes that at least the first start determination condition related to the traveling start operation by the rider is satisfied. However, that the in-stopping start condition is satisfied is not limited to this. That the in-stopping start condition is satisfied may denote that the first start determination condition is satisfied, and in addition, one or more of the second start determination condition regarding the charging amount of the battery 40 and a third start determination condition are satisfied. The third start determination condition is a condition that the opening degree of the throttle which is commanded by the detection signals of the throttle position sensor 63 is a first throttle threshold or more. For example, the first throttle threshold may be set such that a required load, which is required for the traveling driving source 7 in accordance with the opening degree of the throttle corresponding to the first throttle threshold, exceeds maximum generated torque of the drive motor D. When the third start determination condition is satisfied, a high load is required for the traveling driving source 7, and the operation of the internal combustion engine E may be required.

In response to the ECU 50 determining that a traveling stop condition is satisfied while the motorcycle 1 is traveling in the HEV mode, the ECU 50 stops the internal combustion engine E. That the traveling stop condition is satisfied denotes that at least the third stop determination condition regarding the state of the battery 40 is satisfied, and does not denote that the first stop determination condition regarding the state of the movement stop of the motorcycle 1 is satisfied. That the traveling stop condition is satisfied may denote that the third stop determination condition is satisfied, and in addition, at least an eighth stop determination condition, a ninth stop determination condition, or both of these determination conditions are satisfied.

The eighth stop determination condition is a condition that the opening degree of the throttle which is commanded by the detection signals of the throttle position sensor 63 is a second throttle threshold or less. For example, the second throttle threshold may be set such that a required load, which is required for the traveling driving source 7 in accordance with the opening degree of the throttle corresponding to the second throttle threshold, is not more than the maximum generated torque of the drive motor D. Therefore, when the eighth stop determination condition is satisfied, a low load is required for the traveling driving source 7, and the operation of the internal combustion engine E may be unnecessary.

The ninth stop determination condition is a condition that the detection result of the clutch sensor 68 indicates that the clutch C is in the disengaged state. After the ECU 50 determines that the traveling stop condition is satisfied, the ECU 50 may cause the clutch actuator 71 to shift the clutch C to the disengaged state. In this case, the traveling stop condition does not have to include the ninth stop determination condition.

In response to the ECU 50 that a traveling start condition is satisfied while the motorcycle 1 is traveling in the HEV mode, the ECU 50 starts the internal combustion engine E. That the traveling start condition is satisfied may denote that the second start determination condition regarding the charging amount of the battery 40 is satisfied. That the traveling start condition is satisfied may denote that in addition to or instead of the second start determination condition, the third start determination condition regarding the throttle is satisfied.

The predetermined voltage value of the third stop determination condition may be the same or may be different between the in-stopping stop condition and the traveling stop condition. The predetermined voltage value of the second start determination condition may be the same or may be different between the in-stopping start condition and the traveling start condition. The first throttle threshold of the third start determination condition may be the same or may be different between the in-stopping start condition and the traveling start condition.

The ECU 50 may be configured to perform the operation of this modified example based on the operation of the ECU 50 in the embodiment, Modified Example 1, or Modified Example 2. For example, when performing the operation based on the operation shown in FIG. 4 related to the embodiment and Modified Example 2, the ECU 50 may execute the processing of determining after Step S101 and S102 whether or not the traveling speed of the motorcycle 1 is zero. When the traveling speed of the motorcycle 1 is zero, the ECU 50 executes Steps S103 to S108 in accordance with the in-stopping stop condition and the in-stopping start condition which are respectively the same as the stop condition and the start condition in the embodiment.

When the traveling speed of the motorcycle 1 is not zero, the ECU 50 determines whether or not the traveling stop condition is satisfied and whether or not the protection condition is satisfied. When the traveling stop condition is satisfied, and the protection condition is not satisfied, the ECU 50 stops the internal combustion engine E. When the traveling stop condition is not satisfied, or the protection condition is satisfied, the ECU 50 returns to Step S101. In response to the ECU 50 determining while the internal combustion engine E is in the stop state that the traveling start condition is satisfied, the ECU 50 starts the internal combustion engine E and increases the count number of the start operation which is stored in the memory M.

For example, when performing the operation based on the operation shown in FIG. 6 related to Modified Examples 1 and 2, the ECU 50 may execute the processing of determining after Steps S205 and S206 whether or not the traveling speed of the motorcycle 1 is zero. When the traveling speed of the motorcycle 1 is zero, the ECU 50 executes Steps S207 to S212 in accordance with the in-stopping stop condition and the in-stopping start condition. When the traveling speed of the motorcycle 1 is not zero, the ECU 50 performs the same processing as above based on the result of the determination regarding whether or not the traveling stop condition is satisfied and the result of the determination regarding whether or not the protection condition is satisfied.

In not only a case where the motorcycle 1 is in the movement stop but also a case where the motorcycle 1 is traveling, the ECU 50 according to this modified example stops and starts the internal combustion engine E based on the stop condition and the start condition in each case.

In the process of the above-described operation regarding FIGS. 4 and 6, the ECU 50 may execute the processing of changing the count number of the start operation based on the one or more motor conditions described in Modified Example 2. The ECU 50 may be configured to execute, in the process of the above-described operation or in a different processing system in parallel, processing of counting the start operation of the internal combustion engine E when the mode shifts to the charging mode, processing of counting the start operation of the internal combustion engine E when the EV mode shifts to the HEV mode, and processing of adding the start operation at the time of the shift to the count number stored in the memory M.

Modified Example 4

Modified Example 4 of the embodiment will be described. In the embodiment and Modified Examples 1 to 3, when the internal combustion engine E starts once, the ECU 50 adds "1" to the count number of the start operation which is stored in the memory M. In accordance with the satisfied condition, the ECU 50 according to Modified Example 4 changes a value added to the count number of the start operation each time the internal combustion engine E starts. In this modified example, differences from the embodiment and Modified Examples 1 to 3 will be described, and the same explanations as the embodiment or Modified Example 1, 2, or 3 are suitably omitted.

In accordance with whether or not a value change condition that is a predetermined condition is satisfied, the ECU 50 according to this modified example changes the value added to the count number of the start operation, which is stored in the memory M, after the internal combustion engine E is started. Thus, the ECU 50 can set such that the protection condition becomes more difficult to be satisfied or becomes easier to be satisfied.

The value change condition includes one or more of a first value change determination condition regarding the moving state of the motorcycle 1 at the start of the internal combustion engine E and a second value change determination condition that is the same as the change determination condition in Modified Examples 1 and 2.

The first value change determination condition is a condition regarding whether the moving state of the motorcycle 1 at the start of the internal combustion engine E is the movement stop state or a movement traveling state. When the motorcycle 1 is in the movement stop state, the ECU 50 may add a first value to the count number of the start operation. When the motorcycle 1 is in the movement traveling state, the ECU 50 may add a second value, which is smaller than the first value, to the count number of the start operation. This is because the temperature of the heat generating part, such as the starter motor 20, may be lower in the movement traveling state than in the movement stop state. The ECU 50 may decrease the second value as the traveling speed of the motorcycle 1 at the start of the internal combustion engine E increases. When the traveling speed of the motorcycle 1 at the start of the internal combustion engine E is a speed threshold or more, the ECU 50 may set the second value to zero. For example, the speed threshold may be set to a value that is the first speed threshold or more.

The second value change determination condition includes one or more of conditions that are the same as the second change determination condition and the third change determination condition in Modified Examples 1 and 2.

When the second value change determination condition includes the outside air temperature condition, the ECU 50 may increase the value added to the count number of the start operation as the temperature range corresponding to the outside air temperature becomes high at the start of the internal combustion engine E or in a predetermined period of time such as the second period of time, and may decrease the value added to the count number of the start operation as this temperature range becomes low.

When the second value change determination condition includes the first history determination condition, and the first time interval at the start of the internal combustion engine E is the first time threshold or more, the ECU 50 may add the first value to the count number of the start operation. When the second value change determination condition includes the first history determination condition, and the first time interval at the start of the internal combustion engine E is less than the first time threshold, the ECU 50 may add the second value, which is larger than the first value, to the count number of the start operation.

When the second value change determination condition includes the second history determination condition, and the traveling speed of the motorcycle 1 in the third period of time at the start of the internal combustion engine E is the second speed threshold or less, the ECU 50 may add the first value to the count number of the start operation. When the second value change condition includes the second history determination condition, and the traveling speed of the motorcycle 1 in the third period of time at the start of the internal combustion engine E is more than the second speed threshold, the ECU 50 may add the second value, which is smaller than the first value, to the count number of the start operation.

When the second value change determination condition includes the third history determination condition, and the traveling speed of the motorcycle 1 in the fourth period of time at the start of the internal combustion engine E is the third speed threshold or more and less than the first speed threshold, the ECU 50 may add the first value to the count number of the start operation. When the second value change determination condition includes the third history determination condition, and the traveling speed of the motorcycle 1 in the fourth period of time at the start of the internal combustion engine E is less than the third speed threshold, the ECU 50 may add the second value, which is larger than the first value, to the count number of the start operation.

When the second value change determination condition includes the fourth history determination condition, and the time it takes to perform the start operation of the internal combustion engine E is the second time threshold or more, the ECU 50 may add the first value to the count number of the start operation. When the second value change determination condition includes the fourth history determination condition, and the above-described time is less than the second time threshold, the ECU 50 may add the second value, which is smaller than the first value, to the count number of the start operation.

When the second value change determination condition includes the fifth history determination condition, and the load required for the start of the internal combustion engine E is the first load threshold or more, the ECU 50 may add the first value to the count number of the start operation. When the second value change determination condition includes the fifth history determination condition, and the above-described load is less than the first load threshold, the ECU 50 may add the second value, which is smaller than the first value, to the count number of the start operation.

When the second value change determination condition includes the sixth history determination condition, and the number of times of the start operation of the internal combustion engine E per unit time at the start of the internal combustion engine E is the second history threshold or more, the ECU 50 may add the first value to the count number of the start operation. When the second value change determination condition includes the sixth history determination condition, and the above-described number of times is less than the second history threshold, the ECU 50 may add the second value, which is smaller than the first value, to the count number of the start operation.

When the second value change determination condition includes the first motor condition, and the number of times per unit time of the shift from the single driving state of the drive motor D to the non-single driving state of the drive motor D in the fifth period of time at the start of the internal combustion engine E is the first shift threshold or more, the ECU 50 adds the first value to the count number of the start operation. When the second value change determination condition includes the first motor condition, and the above-described number of times is less than the first shift threshold, the ECU 50 may add the second value, which is smaller than the first value, to the count number of the start operation.

When the second value change determination condition includes the second motor condition, and the time period of the single driving of the drive motor D in the sixth period of time at the start of the internal combustion engine E is the third time threshold or more, the ECU 50 may add the first value to the count number of the start operation. When the second value change determination condition includes the second motor condition, and the above-described time period is less than the third time threshold, the ECU 50 may add the second value, which is smaller than the first value, to the count number of the start operation.

When the second value change determination condition includes the third motor condition, and the time period of the single driving of the drive motor D in the seventh period of time at the start of the internal combustion engine E is the fourth time threshold or less, the ECU 50 may add the first value to the count number of the start operation. When the second value change determination condition includes the third motor condition, and the above-described time period is more than the fourth time threshold, the ECU 50 may add the second value, which is larger than the first value, to the count number of the start operation.

When the second value change determination condition includes the fourth motor condition, and the time period of the charging mode in the eighth period of time at the start of the internal combustion engine E is the fifth time threshold or more, the ECU 50 may add the first value to the count number of the start operation. When the second value change determination condition includes the fourth motor condition, and the above-described time period is less than the fifth time threshold, the ECU 50 may add the second value, which is smaller than the first value, to the count number of the start operation.

The ECU 50 may be configured to perform the operation of this modified example based on the operation of the ECU 50 in the embodiment or Modified Example 1, 2, or 3. In each of these cases, the ECU 50 may determine whether or not the value change condition is satisfied, between the processing of starting the internal combustion engine E and the processing of increasing the count number of the start operation of the internal combustion engine E which is stored in the memory M, and may reflect the result of the determination on the processing of increasing the count number. The ECU 50 according to this modified example may omit the processing regarding the change condition. The ECU 50 according to this modified example can change the protection condition by changing the value added to the count number of the start operation of the internal combustion engine E.

The foregoing has described the exemplary embodiment and the modified examples of the present disclosure. However, the present disclosure is not limited to the above embodiment and the above modified examples. To be specific, various modifications and improvements may be made within the scope of the present disclosure. For example, embodiments prepared by variously modifying the embodiment and the modified examples and embodiments prepared by combining components in different embodiments and modified examples are included in the scope of the present disclosure.

For example, in the embodiment and the modified examples, the ECU 50 changes the protection condition by increasing or decreasing the count number of the start operation of the internal combustion engine E which is stored in the memory M. However, the processing of the ECU 50 is not limited to this. For example, the ECU 50 may change the protection condition such that the protection condition becomes easier to be satisfied or becomes more difficult to be satisfied, by executing the combination of one or more of: the processing of increasing or decreasing the count number; the processing of increasing or decreasing the first history threshold that is a threshold of the count number; the processing of increasing or decreasing the first speed threshold that is a threshold of the speed for decreasing the count number; and the processing of increasing or decreasing the value added to the count number.

In the embodiment and the modified examples, the motorcycle is described as the vehicle 1 on which the ECU 50 is mounted. However, the vehicle 1 may be a vehicle including an internal combustion engine. The vehicle 1 is a movable body that can accommodate one or more persons and move. However, the vehicle 1 is not limited to this. For example, the vehicle 1 may be a movable body that can accommodate objects or living things other than persons and move or may be a movable body that cannot accommodate objects or living things.

In the embodiment and the modified examples, the motorcycle 1 is a straddled vehicle but may be a scooter vehicle including a floorboard in front of a seat. Regardless of the type of the motorcycle 1, the internal combustion engine E may be located between the seat 6 and the front wheel 2 or may be located a position other than this. For example, as is often seen in the scooter vehicles, the internal combustion engine E may be located so as to swing together with a swing arm. The motorcycle 1 may be a vehicle including a cowl as the outer shell structure 8 or may be a vehicle of a naked type not including a cowl.

The structure of the internal combustion engine E mounted on the vehicle 1 according to each of the embodiment and the modified examples may be any existing structure. For example, the number of cylinders of the internal combustion engine E may be one or plural. The internal combustion engine E may be a four-stroke cycle engine or a two-stroke cycle engine. The fuel used by the internal combustion engine E may be any fuel, such as fuel containing a hydrocarbon compound, fuel derived from an animal or a plant, or fuel of non-carbide. Examples of the fuel containing the hydrocarbon compound include gasoline, ethanol, propane gas, and methane. One example of the fuel derived from an animal or a plant is biofuel. One example of the fuel of non-carbide is hydrogen.

In the embodiment and the modified examples, the cooling heat exchange structure of the heat generating part includes a structure that introduces the traveling wind to the heat generating part to cool the heat generating part. However, the cooling heat exchange structure of the heat generating part is not limited to this. For example, in addition to or instead of the above structure, the cooling heat exchange structure may include a structure which includes, at the heat generating part, a projection, such as a fin, or a heat sink to increase a contact area between the heat generating part and air. In addition to or instead of the above structure, the cooling heat exchange structure may include a structure that cools the heat generating part by using a heat medium. Examples of the heat medium may include water, oil, and a cooling medium. The cooling heat exchange structure may include a structure in which the heat medium flows inside the heat generating part or flows along an outer surface of the heat generating part, and may further include a heat exchanger that performs heat exchange between the heat medium and another medium, such as air. The above cooling heat exchange structure may be used to cool any heat generating part.

For example, the battery 40 may include a structure that receives the introduction of the traveling wind while the motorcycle 1 is traveling. The battery 40 may be located below the seat 6 or the fuel tank 13. For example, the battery 40 may be located upward from the crankcase Ea and rearward from the cylinder block Eb. At least a part of the battery 40 may be located so as to be exposed to an outside. The outer shell structure 8 covering the battery 40 may be exposed to an outside. While the motorcycle 1 is traveling, the traveling wind can directly or indirectly cool the battery 40 by contacting the battery 40 or the outer shell structure 8 to perform the heat exchange therewith.

For example, the electric circuitry 41 may include a structure that receives the introduction of the traveling wind while the motorcycle 1 is traveling. The electric circuitry 41 may be located below the seat 6 or the fuel tank 13. For example, the electric circuitry 41 may be located forward of the battery 40. At least a part of the electric circuitry 41 may be located so as to be exposed to an outside. The outer shell structure 8 covering the electric circuitry 41 may be exposed to an outside. While the motorcycle 1 is traveling, the traveling wind can directly or indirectly cool the electric circuitry 41 as with the battery 40.

In each of the motorcycles 1 according to the embodiment and the modified examples, the starter motor 20 is a starter generator including the drive function and the power generator function, but may be a motor, such as a self-starter, which includes only the drive function. The starter motor 20 may be located as a device different from an alternator for electric power generation. The starter motor 20 may be connected to the crankshaft Ec through a power transmitting structure, such as a belt, a chain, or a gear. The starter motor 20 may be connected to the crankshaft Ec through a speed reducer or the like so as to transmit its rotational power to the crankshaft Ec with reducing its rotational speed. In both of a case where the starter motor 20 includes the drive function and the power generator function and a case where the starter motor 20 includes only the drive function, the starter motor 20 may include any of the structure of an AC motor and the structure of a DC motor.

Each of the motorcycles 1 according to the embodiment and the modified examples includes a structure that introduces the traveling wind to the coil portion 20*ba* of the starter motor 20 through the duct 20*e*. However, the motorcycle 1 is not limited to this. For example, in both of a case where the starter motor 20 includes the drive function and the power generator function and a case where the starter motor 20 includes only the drive function, at least a part of the starter motor 20 may be located so as to be exposed to an outside from the outer shell structure 8, and the motorcycle 1 does not have to include the structure that introduces the traveling wind to the coil portion 20*ba*. While the motorcycle 1 is traveling, the traveling wind can cool the starter motor 20 by contacting the starter motor 20 or the cover 20*d* to perform the heat exchange therewith.

Each of the motorcycles 1 according to the embodiment and the modified examples is a hybrid vehicle but may be a non-hybrid vehicle not including the drive motor D. In this case, the structure of the starter motor 20 may include only the drive function or may include the drive function and the power generator function.

Each of the motorcycles 1 according to the embodiment and the modified examples includes a structure in which the electric power generated by the starter motor 20 and the drive motor D is stored in the battery 40. However, the motorcycle 1 is not limited to this. For example, in addition to or instead of the above structure, the motorcycle 1 may include a regenerative brake at one or each of the front wheel 2 and the rear wheel 3 and may include a structure in which the electric power generated by the regenerative brake is stored in the battery 40. The regenerative brake may be a rotating electrical machine that converts rotational energy of the front wheel 2 or the rear wheel 3 into electric energy.

In each of the motorcycles 1 according to the embodiment and the modified examples, the starter motor 20 and the drive motor D are located as separate devices. However, one of the starter motor 20 and the drive motor D may serve as the other. For example, the motorcycle 1 may include a structure in which the drive motor D also serves as the starter motor 20. The drive motor D is connected to the crankshaft Ec through the clutch C such that the power can be transmitted or cut between the drive motor D and the crankshaft Ec. However, the drive motor D may be connected to the crankshaft Ec so as to be able to transmit the power at all times. Such drive motor D is one example of a starter motor. Or, the motorcycle 1 may include a structure in which the starter motor 20 serves as the drive motor D. For example, the ECU 50 may be configured to drive the starter motor 20 at a time other than the start of the internal combustion engine E to increase the driving power to be transmitted to the rear wheel 3 by the driving power of the starter motor 20.

Examples of the aspects of the technology of the present disclosure will be described below. Control circuitry according to a first aspect of the present disclosure is control circuitry for a vehicle that is configured to perform stop control of an internal combustion engine therein, the control circuitry being configured to: stop the internal combustion engine in response to determining based on information indicating a predetermined vehicle state that a predetermined stop condition is satisfied; prevent the internal combustion engine from stopping in response to determining based on the information indicating the vehicle state that the stop condition is satisfied, but determining that a protection condition for a heat generating part that generates heat at the start of the internal combustion engine is satisfied; and in response to determining that a traveling speed of the vehicle increases and reaches a predetermined speed threshold, change the protection condition such that the protection condition becomes more difficult to be satisfied than before the traveling speed of the vehicle reaches the speed threshold. In the present specification and the claims, the expression "when . . . determine . . . " may denote an expression "in response to determining . . . ."

In the first aspect, when the internal combustion engine repeatedly starts, the heat generating part may excessively increase in temperature by heat generation. Therefore, when the protection condition is satisfied, the control circuitry prevents the internal combustion engine from stopping even if the stop condition is satisfied. Thus, the heat generating part can be prevented from overheating. Since the vehicle receives the traveling wind during traveling, the heat generating part may be cooled by the traveling wind. When the traveling speed of the vehicle increases and reaches the speed threshold, the cooling of the heat generating part by the traveling wind can be expected. In such a case, the control circuitry sets the protection condition to relax the temperature protection such that the protection condition becomes more difficult to be satisfied. Thus, the opportunity of preventing the internal combustion engine from stopping due to the protection condition can be reduced. Therefore, the opportunity of the stop of the internal combustion engine can be increased.

The control circuitry according to a second aspect of the present disclosure may be configured such that: in the first aspect, the protection condition is a condition associated with a start history of the internal combustion engine; and based on the start history of a start operation which has actually been performed by the internal combustion engine, the control circuitry determines whether or not the protection condition is satisfied.

According to the second aspect, since the protection condition is a condition associated with the start history of the internal combustion engine, the protection condition may be set based on the start history. Therefore, the protection condition may be accurately set in relation to the temperature of the heat generating part that generates heat at the start of the internal combustion engine. For example, since the protection condition is a condition associated with the start history, the installation of a sensor that measures the temperature of the heat generating part can be omitted.

The control circuitry according to a third aspect of the present disclosure may be configured such that in the first or second aspect, in response to the traveling speed of the vehicle being the speed threshold or more, the control circuitry prevents establishment of the protection condition by canceling the protection condition.

In the third aspect, when the traveling speed of the vehicle is the speed threshold or more, and the stop condition is satisfied, the control circuitry can realize the stop of the internal combustion engine without the limitation by the protection condition. Therefore, the opportunity of the stop of the internal combustion engine can be increased more than when the vehicle maintains the traveling speed of less than the speed threshold.

The control circuitry according to a fourth aspect of the present disclosure may be configured such that: in any one of the first to third aspects, the start history includes a count number that is obtained by counting the number of times of the start operation of the internal combustion engine while a state where electric power is supplied to the control circuitry is maintained; the protection condition includes a condition that the count number is a first threshold or more; and in response to the traveling speed of the vehicle being the speed threshold or more, the control circuitry performs a change of the protection condition which corresponds to an increase in the first threshold.

According to the fourth aspect, the control circuitry can set the protection condition by using the count number of the start operation of the internal combustion engine and the first threshold of the count number. Without requiring complex calculation expressions and control maps, the control circuitry can set, by simple processing, the protection condition used until the traveling speed of the vehicle reaches the speed threshold from less than the speed threshold and the protection condition used after the traveling speed of the vehicle reaches the speed threshold.

The control circuitry according to a fifth aspect of the present disclosure may be configured such that: in any one of the first to fourth aspects, the control circuitry changes the protection condition such that as an outside air temperature becomes lower, the protection condition becomes more difficult to be satisfied; or the control circuitry changes the protection condition such that as the outside air temperature becomes lower, the speed threshold becomes lower.

According to the fifth aspect, when the outside air temperature is low, the control circuitry can suppress excessive protection of the heat generating part, and therefore, can increase the opportunity of the stop of the internal combustion engine.

The control circuitry according to a sixth aspect of the present disclosure may be configured such that: in any one of the second to fifth aspects, the start history includes one or more of elements that are a time interval between the start operations of the internal combustion engine, the traveling speed of the vehicle between the start operations of the internal combustion engine, a time it takes to perform the start operation of the internal combustion engine, a load required for the start of the internal combustion engine, and the number of times of the start operation of the internal combustion engine per unit time; and based on one or more of the elements of the start history of the start operation which has actually been performed by the internal combustion engine, the control circuitry changes the protection condition such that the protection condition becomes easier to be satisfied or more difficult to be satisfied.

According to the sixth aspect, the start history can accurately reflect the temperature increase state of the heat generating part. Since the protection condition is changed based on the start history, the protection condition may be set as a condition which accurately corresponds to the temperature state of the heat generating part. Therefore, the control circuitry can stop the internal combustion engine and prevent the internal combustion engine from stopping in accordance with the temperature of the heat generating part. Thus, the opportunity of the stop of the internal combustion engine can be increased.

A vehicle according to a seventh aspect of the present disclosure includes: an internal combustion engine that is a traveling driving source; a start electrical structure that starts the internal combustion engine; a cooling heat exchange structure that directly or indirectly performs heat exchange with traveling wind to cool the start electrical structure; a sensor that detects a vehicle state; control circuitry configured to perform stop control of the internal combustion engine; and an actuator that controls the internal combustion engine in accordance with a command from the control circuitry, wherein the control circuitry is configured to control the actuator to stop the internal combustion engine in response to determining, based on information acquired from the sensor and indicating a predetermined vehicle state, that a predetermined stop condition is satisfied, prevent the internal combustion engine from stopping in response to determining based on the information indicating the vehicle state that the stop condition is satisfied, but determining that a protection condition for the start electrical structure that generates heat at the start of the internal combustion engine is satisfied, and in response to determining based on the information acquired from the sensor that a traveling speed of the vehicle reaches a predetermined speed threshold, change the protection condition such that the protection condition becomes more difficult to be satisfied than before the traveling speed of the vehicle reaches the speed threshold.

According to the seventh aspect, the same effects as the control circuitry according to each aspect of the present disclosure can be obtained. Moreover, the cooling heat exchange structure can actively cool the start electrical structure by performing the heat exchange between the traveling wind and the start electrical structure. Thus, as compared to when the vehicle does not include a structure that actively performs the heat exchange of the start electrical structure, the start electrical structure can be adequately cooled even while the vehicle is traveling at low speed. As a result, even when the speed threshold is further lowered, preventing the internal combustion engine from stopping by the protection condition can suppress the overheat of the heat generating part and prevent damages of the heat generating part due to the overheat. By further lowering the speed threshold, the opportunity of the stop of the internal combustion engine can be increased.

The vehicle according to an eighth aspect of the present disclosure may further include, in the seventh aspect, an outer shell structure that constitutes an outer shell of the vehicle and is exposed to an outside, wherein at least a part of the internal combustion engine is located so as to be exposed to an outside from the outer shell structure.

According to the eighth aspect, the start electrical structure may be located at or in the vicinity of the internal combustion engine. Since at least a part of the internal combustion engine is exposed to an outside from the outer shell structure, the traveling wind easily reach the start electrical structure.

The vehicle according to a ninth aspect of the present disclosure may include, in the seventh or eighth aspect, a seat straddled by a person, wherein the vehicle is a straddled vehicle.

In the ninth aspect, the straddled vehicle easily includes a structure in which the internal combustion engine is mounted such that a part of the internal combustion engine is exposed to an outside. Therefore, the traveling wind easily reach the start electrical structure.

The vehicle according to a tenth aspect of the present disclosure may be configured such that in any one of the seventh to ninth aspects, the start electrical structure includes a structure that includes a function of a starter that starts the internal combustion engine and a function of a generator that generates electric power by driving power of the internal combustion engine.

According to the tenth aspect, while the vehicle is traveling, the start electrical structure generates electric power by being forcibly driven by the internal combustion engine, and stores the generated electric power in the battery. Therefore, the start electrical structure and the battery may generate heat by electric power generation and charging even while the vehicle is traveling. Thus, the protection condition may be set to make the temperature protection strict. However, when the traveling speed of the vehicle increases and reaches the speed threshold, the protection condition may be set to relax the temperature protection. Therefore, the opportunity of the stop of the internal combustion engine can be increased.

The vehicle according to an eleventh aspect of the present disclosure may further include: in any one of the seventh to tenth aspects, a wheel by which the vehicle travels; a rotating electrical machine that is a traveling driving source; and a drive structure connected to the internal combustion engine and the rotating electrical machine such that driving power of the internal combustion engine and driving power of the rotating electrical machine are transmitted to the drive structure, the drive structure transmitting to the wheel the driving power supplied from the internal combustion engine and the rotating electrical machine, wherein: the control circuitry controls operation of the rotating electrical machine and executes control in one or more control modes; and the one or more control modes include a control mode that executes one or both of controlling the actuator to stop the internal combustion engine while the vehicle is traveling and controlling the actuator to start the internal combustion engine that is in a stop state.

According to the eleventh aspect, while the vehicle is traveling, the control circuitry may stop and start the internal combustion engine. Therefore, the opportunity of the start of the internal combustion engine increases, and the heat generating part tends to increase in temperature. Thus, the protection condition may be set so as to make the temperature protection strict. However, when the traveling speed of the vehicle increases and reaches the speed threshold, the protection condition may be set so as to relax the temperature protection. Therefore, the opportunity of the stop of the internal combustion engine can be increased.

The control circuitry according to a twelfth aspect of the present disclosure may execute: in any one of the first to eleventh aspects, while the start history including the history of the start of the internal combustion engine by the start electrical structure satisfies a prohibition condition for prohibiting the stop and start of the internal combustion engine, prohibition of the stop and start of the internal combustion engine; and when the traveling speed of the vehicle is a first traveling speed or more, the change of the start history such that the start history deviates from the prohibition condition or separates from the prohibition condition.

In the twelfth aspect, since the start electrical structure generates heat in operation, the temperature of the start electrical structure may become high depending on the start history. Therefore, while the start history satisfies the prohibition condition, the control circuitry prohibits the stop and start of the internal combustion engine. Thus, the operation of the start electrical structure is restricted, and the temperature increase of the start electrical structure is suppressed. Moreover, when the vehicle travels, the start electrical structure may be cooled by the traveling wind. Therefore, when the vehicle travels at not less than the first traveling speed at which the start electrical structure is cooled by the traveling wind, the control circuitry changes the start history such that the start history deviates from the prohibition condition or separates from the prohibition condition. Thus, the execution of the prohibition of the stop and start of the internal combustion engine is relaxed. Therefore, without using the temperature information of the start electrical structure, the control circuitry can prohibit the stop and start of the internal combustion engine in accordance with the temperature state of the start electrical structure which changes during the operation of the vehicle. One example of the prohibition condition is the protection condition.

The control circuitry according to a thirteenth aspect of the present disclosure may be configured such that: in any one of the first to twelfth aspects, when an elapsed time between a first timing at which the internal combustion engine is started and a second timing at which the internal combustion engine is started immediately before the first timing is less than a second threshold, the control circuitry adds the start of the internal combustion engine at the first timing to the count number; and when the elapsed time between the first timing and the second timing is the second threshold or more, the control circuitry does not add the start of the internal combustion engine at the first timing to the count number.

In the thirteenth aspect, when the elapsed time between the first timing and the second timing is the second threshold or more, the temperature of the start electrical structure may lower until the time reaches the first timing. The control circuitry determines whether to add the start of the internal combustion engine to the count number in accordance with the temperature change of the start electrical structure. Therefore, the control circuitry can avoid frequently preventing the internal combustion engine from stopping and can reduce the amount of exhaust gas from the internal combustion engine. Then, the protection condition can become difficult to be satisfied.

The control circuitry according to a fourteenth aspect of the present disclosure may be configured such that in the thirteenth aspect, when the elapsed time between the first timing and the second timing is the second threshold or more, the control circuitry does not add the start of the internal combustion engine at the first timing to the count number and reduce the count number. According to the fourteenth aspect, the control circuitry can reduce the frequency of the prohibition state of the stop and the start. Then, the protection condition can become difficult to be satisfied.

The control circuitry according to a fifteenth aspect of the present disclosure may be configured such that in any one of the first to fourteenth aspects, when the vehicle continues a traveling speed, which is not more than a second traveling speed that is lower than the first traveling speed, for a first duration time, the control circuitry increases the count number.

According to the fifteenth aspect, when the vehicle travels at a low traveling speed, which is the second traveling speed or less, for the first duration time, the start electrical structure may increase in temperature. In such a case, the control circuitry easily reaches the prevention of the stop and start of the internal combustion engine by increasing the count number, and can suppress the temperature increase of the start electrical structure. Then, the protection condition can become easy to be satisfied.

The control circuitry according to a sixteenth aspect of the present disclosure may be configured such that in any one of the first to fifteenth aspects, when the vehicle continues a traveling speed, which is not less than a third traveling speed that is lower than the first traveling speed and higher than the second traveling speed, for a second duration time, the control circuitry reduces the count number.

According to the sixteenth aspect, when the vehicle travels at not less than the third traveling speed which is lower than the first traveling speed and higher than the second traveling speed, for the second duration time, the start electrical structure may be cooled by the traveling wind to be lowered in temperature. In such a case, the control circuitry can reduce the count number to reduce the frequency of the prevention of the stop and start of the internal combustion engine. Then, the protection condition can become difficult to be satisfied.

The control circuitry according to a seventeenth aspect of the present disclosure may be configured such that in any one of the first to sixteenth aspects, when the vehicle operates in the charging mode in which the electric power generated by the power generator included in the vehicle is stored in a storage battery included in the vehicle, the control circuitry increases the count number.

According to the seventeenth aspect, the storage battery may generate heat at the time of the charging, and this may increase the temperature of the start electrical structure. In such a case, the control circuitry can increase the count number to easily realize the prevention of the stop and start of the internal combustion engine. Then, the protection condition can become easy to be satisfied.

The control circuitry according to an eighteenth aspect of the present disclosure may be configured such that in any one of the first to seventeenth aspects, when the vehicle further including a traveling motor travels by the traveling motor without operating the internal combustion engine, the control circuitry reduces the count number.

According to the eighteenth aspect, at the time of so-called EV traveling in which the vehicle travels by the traveling motor without operating the internal combustion engine, the heat generation from the internal combustion engine is suppressed, and the heat transferred from the internal combustion engine to the start electrical structure decreases. In such a case, the control circuitry can reduce the count number to reduce the frequency of the prevention of the stop and start of the internal combustion engine. Then, the protection condition can become difficult to be satisfied.

A method of controlling a stop of an internal combustion engine according to one aspect of the present disclosure includes: acquiring information indicating a predetermined vehicle state; determining based on the information indicating the vehicle state whether or not a predetermined stop condition is satisfied; determining whether or not a protection condition for a heat generating part that generates heat at the start of the internal combustion engine is satisfied; stopping the internal combustion engine in response to determining that the stop condition is satisfied, and the protection condition is not satisfied; preventing the internal combustion engine from stopping in response to determining that the stop condition is satisfied, and the protection condition is satisfied; determining whether or not a traveling speed of the vehicle reaches a predetermined speed threshold; and in response to determining that the traveling speed of the vehicle reaches the speed threshold, changing the protection condition such that the protection condition becomes more difficult to be satisfied than before the traveling speed of the vehicle reaches the speed threshold.

According to the above aspect, the same effects as the control circuitry according to each aspect of the present disclosure are obtained. For example, a part of the method of the present disclosure or the entire method of the present disclosure may be realized by: a circuit, such as a CPU or an LSI; an IC card; a single module; or the like. The elements included in the method of the present disclosure may be realized by a single device or by two or more devices.

The present disclosure may be a computer program that makes a computer execute the method according to each aspect of the present disclosure. Such computer program can obtain the same effects as the method according to each aspect of the present disclosure. The computer program may be, for example, a program recorded in a non-transitory, computer-readable tangible medium. The computer program may be read out from the medium by using a medium drive device and installed in a computer. The computer program may be, for example, a program which can be distributed through a transmission medium, such as the Internet, and may be downloaded and installed in a computer.

The functionality of the elements disclosed herein may be implemented using circuitry or processing circuitry which includes general purpose processors, special purpose processors, integrated circuits, ASICs, conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

All of the numerals used herein, such as the ordinal numbers and those indicating quantities, are examples used to specifically describe the technology of the present disclosure, and the present disclosure is not limited to those example numerals. Connection relationships among the components herein are mere examples to specifically describe the technology of the present disclosure, and connection relationships that realize the functions of the present disclosure are not limited to these examples.

As the present disclosure may be embodied in various forms without departing from the scope of the essential features thereof, the illustrative embodiment and variations are therefore illustrative and not restrictive, since the scope of the present disclosure is defined by the appended claims rather than by the description preceding them. All changes that fall within metes and bounds of the claims, or equivalence of such metes and bounds thereof are therefore intended to be embraced by the claims.

What is claimed is:

1. Control circuitry for a vehicle that is configured to perform stop control of an internal combustion engine therein, the control circuitry being configured to:
   stop the internal combustion engine in response to determining based on information indicating a predetermined vehicle state that a predetermined stop condition is satisfied;
   prevent the internal combustion engine from stopping in response to determining based on the information indicating the vehicle state that the stop condition is satisfied, but determining that a protection condition for a heat generating part that generates heat at the start of the internal combustion engine is satisfied; and
   in response to determining that a traveling speed of the vehicle increases and reaches a predetermined speed threshold, change the protection condition such that the protection condition becomes more difficult to be satisfied than before the traveling speed of the vehicle reaches the speed threshold, wherein:
   the protection condition is a condition associated with a start history of the internal combustion engine;
   based on the start history of a start operation which has actually been performed by the internal combustion engine, the control circuitry determines whether or not the protection condition is satisfied;
   the start history includes a count number that is obtained by counting the number of times of the start operation of the internal combustion engine while a state where electric power is supplied to the control circuitry is maintained;
   the protection condition includes a condition that the count number is a first threshold or more; and
   in response to the traveling speed of the vehicle being the speed threshold or more, the control circuitry performs a change of the protection condition, in which a difference between the count number and the first threshold is increased, such that the protection condition becomes more difficult to be satisfied.

2. The control circuitry according to claim 1, wherein in response to the traveling speed of the vehicle being the speed threshold or more, the control circuitry prevents establishment of the protection condition by canceling the protection condition.

3. The control circuitry according to claim 1, wherein:
   the control circuitry changes the protection condition such that as an outside air temperature becomes lower, the protection condition becomes more difficult to be satisfied; or the control circuitry changes the protection condition such that as the outside air temperature becomes lower, the speed threshold becomes lower.

4. The control circuitry according to claim 1, wherein:

the start history further includes one or more of elements that are a time interval between the start operations of the internal combustion engine, the traveling speed of the vehicle between the start operations of the internal combustion engine, a time it takes to perform the start operation of the internal combustion engine, a load required for the start of the internal combustion engine, and the number of times of the start operation of the internal combustion engine per unit time; and based on one or more of the elements of the start history of the start operation which has actually been performed by the internal combustion engine, the control circuitry changes the protection condition such that the protection condition becomes easier to be satisfied or more difficult to be satisfied.

5. A vehicle comprising:

an internal combustion engine that is a traveling driving source;

a start electrical structure that starts the internal combustion engine;

a cooling heat exchange structure that directly or indirectly performs heat exchange with traveling wind to cool the start electrical structure;

a sensor that detects a vehicle state;

control circuitry configured to perform stop control of the internal combustion engine; and an actuator that controls the internal combustion engine in accordance with a command from the control circuitry, wherein:

the control circuitry is configured to:

control the actuator to stop the internal combustion engine in response to determining, based on information acquired from the sensor and indicating a predetermined vehicle state, that a predetermined stop condition is satisfied, prevent the internal combustion engine from stopping in response to determining based on the information indicating the vehicle state that the stop condition is satisfied, but determining that a protection condition for the start electrical structure that generates heat at the start of the internal combustion engine is satisfied, and in response to determining based on the information acquired from the sensor that a traveling speed of the vehicle reaches a predetermined speed threshold, change the protection condition such that the protection condition becomes more difficult to be satisfied than before the traveling speed of the vehicle reaches the speed threshold, wherein:

the protection condition is a condition associated with a start history of the internal combustion engine;

based on the start history of a start operation which has actually been performed by the internal combustion engine, the control circuitry determines whether or not the protection condition is satisfied;

the start history includes a count number that is obtained by counting the number of times of the start operation of the internal combustion engine while a state where electric power is supplied to the control circuitry is maintained;

the protection condition includes a condition that the count number is a first threshold or more; and in response to the traveling speed of the vehicle being the speed threshold or more, the control circuitry performs a change of the protection condition, in which a difference between the count number and the first threshold is increased, such that the protection condition becomes more difficult to be satisfied.

6. The vehicle according to claim 5, further comprising a seat straddled by a person, wherein the vehicle is a straddled vehicle.

7. The vehicle according to claim 5, wherein the start electrical structure includes a structure that includes a function of a starter that starts the internal combustion engine and a function of a generator that generates electric power by driving power of the internal combustion engine.

8. The vehicle according to claim 5, further comprising:

a wheel by which the vehicle travels;

a rotating electrical machine that is a traveling driving source; and a drive structure connected to the internal combustion engine and the rotating electrical machine such that driving power of the internal combustion engine and driving power of the rotating electrical machine are transmitted to the drive structure, the drive structure transmitting to the wheel the driving power supplied from the internal combustion engine and the rotating electrical machine, wherein:

the control circuitry controls operation of the rotating electrical machine and executes control in one or more control modes; and the one or more control modes include a control mode that executes one or both of controlling the actuator to stop the internal combustion engine while the vehicle is traveling and controlling the actuator to start the internal combustion engine that is in a stop state.

* * * * *